United States Patent
Cherian et al.

(10) Patent No.: US 11,651,497 B2
(45) Date of Patent: May 16, 2023

(54) INSEGAN: A GENERATIVE APPROACH TO INSTANCE SEGMENTATION IN DEPTH IMAGES

(71) Applicant: Mitsubishi Electric Research Laboratories, Inc., Cambridge, MA (US)

(72) Inventors: Anoop Cherian, Belmont, MA (US); Goncalo José Dias Pais, Lisbon (PT); Tim Marks, Newton, MA (US); Alan Sullivan, Middleton, MA (US)

(73) Assignee: Mitsubishi Electric Research Laboratories, Inc.

( * ) Notice: Subject to any disclaimer, the term of this patent is extended or adjusted under 35 U.S.C. 154(b) by 309 days.

(21) Appl. No.: 17/212,077

(22) Filed: Mar. 25, 2021

(65) Prior Publication Data

US 2022/0309672 A1   Sep. 29, 2022

(51) Int. Cl.
| | |
|---|---|
| *G06T 7/11* | (2017.01) |
| *G06T 7/50* | (2017.01) |
| *G06T 7/73* | (2017.01) |
| *G06N 3/084* | (2023.01) |
| *G06N 3/045* | (2023.01) |

(52) U.S. Cl.
CPC ............... *G06T 7/11* (2017.01); *G06N 3/045* (2023.01); *G06N 3/084* (2013.01); *G06T 7/50* (2017.01); *G06T 7/75* (2017.01); *G06T 2207/20081* (2013.01); *G06T 2207/20084* (2013.01)

(58) Field of Classification Search
CPC ..... G06T 7/11; G06T 7/50; G06T 7/75; G06T 2207/20081; G06T 2207/20084; G06T 2207/30128; G06N 3/045; G06N 3/084
See application file for complete search history.

(56) References Cited

U.S. PATENT DOCUMENTS

| | | | |
|---|---|---|---|
| 11,593,957 B2* | 2/2023 | Fu | G06T 7/75 |
| 2021/0303925 A1* | 9/2021 | Hofmann | G06V 20/56 |
| 2022/0156522 A1* | 5/2022 | Shechtman | G06F 18/214 |
| 2022/0305647 A1* | 9/2022 | Piergiovanni | G06N 3/045 |

\* cited by examiner

*Primary Examiner* — Bobbak Safaipour
(74) *Attorney, Agent, or Firm* — Gennadiy Vinokur; Hironori Tsukamoto

(57) ABSTRACT

System and method for generating verisimilar images from real depth images. Train a generative adversarial neural network (GAN) by accessing test depth images having identical instances as instances of a real depth image. Input the test depth images in the generator to generate estimated depth images representing an implicit three-dimensional model of the object. Input, each estimated depth image into a discriminator to obtain a loss and into a pose encoder to obtain a matching loss. Iteratively repeat processes until the losses are minimized to a threshold, to end training. Identify the instances in the real image using the trained GAN pose encoder, to produce a pose transformation matrix for each instance in the real image. Identify pixels in the depth images corresponding to the instances of the real image and merge the pixels for the depth images to form an instance segmentation map for the real depth image.

26 Claims, 22 Drawing Sheets

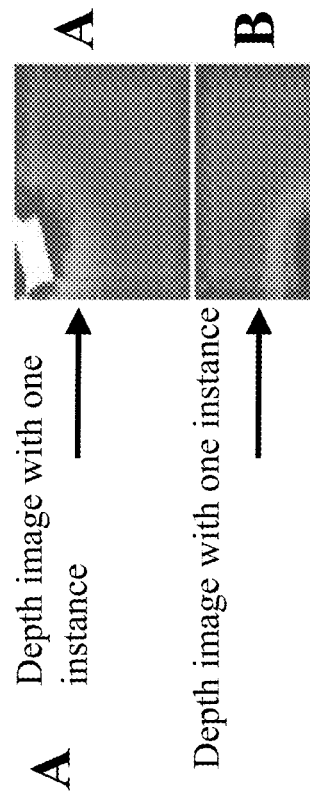

FIG. 2A

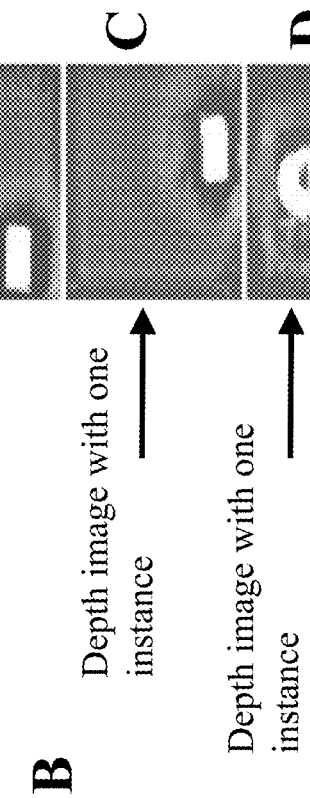

FIG. 2B

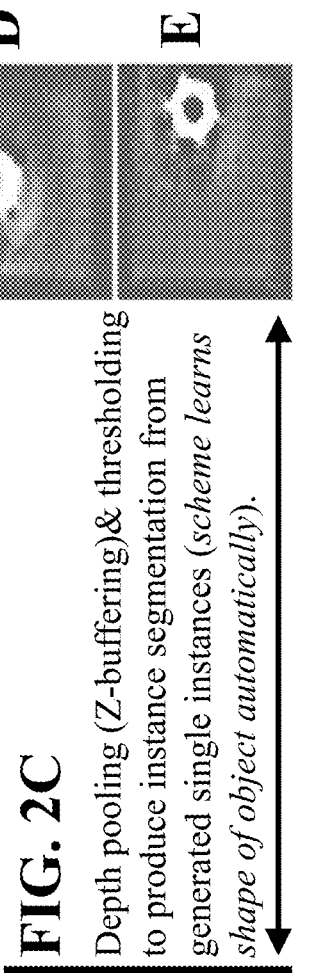

FIG. 2C

Segmentations and single instances disentangled by InSeGAN on a Nut instance depth image from Insta-10 dataset (*InsSeGAN uses only unlabeled depth images for training and does not need labeled depth images*).

A — Depth image with one instance
B — Depth image with one instance
C — Depth image with one instance
D — Depth image with one instance
E — Depth pooling (Z-buffering) & thresholding to produce instance segmentation from generated single instances (*scheme learns shape of object automatically*).

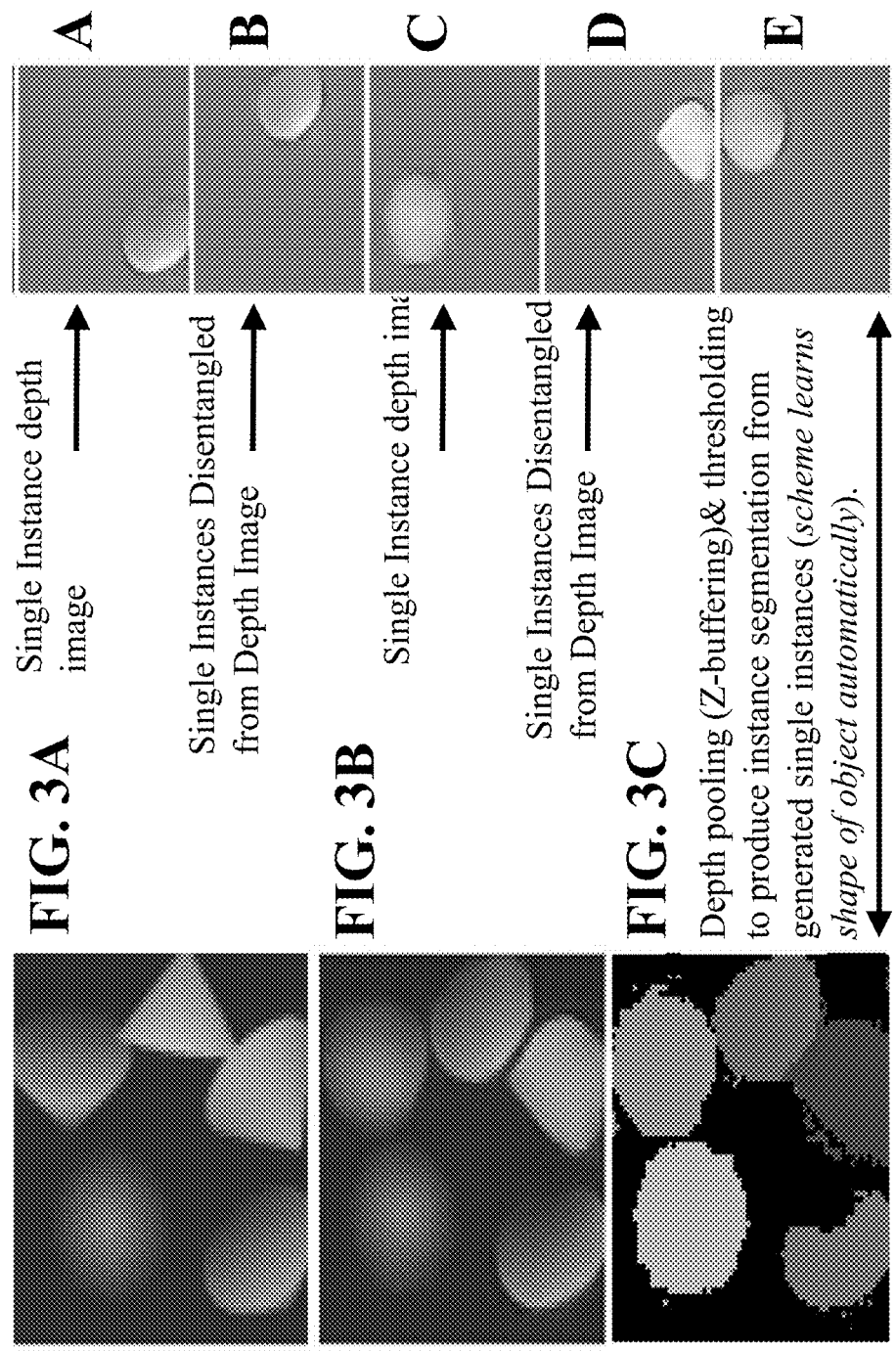

*Qualitative Results Using InstaGAN with Depth Images*

(Input Image to InSeGAN)

(Generated and rendered image which is the synthesized image by InSeGAN corresponding to the real depth image in FIG A)

(FIG. 5C and FIG. 5D show instance segmentations and a single instance of one of the nuts in FIG A rendered independently by the single instance generator at test time)

(Table 1 is Ablative study on the various losses used in InSeGAN generator and the mIoU achieved on two classes)

| Generator Loss | Bolt | Obj01 |
|---|---|---|
| $\mathcal{L}_E^a$ (OT) + $\mathcal{L}_E^i$ + $\mathcal{L}_E^p$ | 0.424 | 0.686 |
| $\mathcal{L}_E^a$ (greedy) + $\mathcal{L}_E^i$ + $\mathcal{L}_E^p$ | 0.383 | 0.664 |
| $\mathcal{L}_E^a$ (OT) + $\mathcal{L}_E^i$ | 0.312 | 0.360 |
| $\mathcal{L}_E^a$ (OT) | 0.303 | 0.402 |

FIG. 11

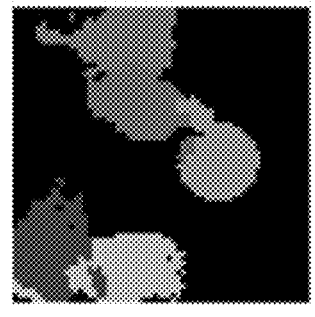
FIG. 12A
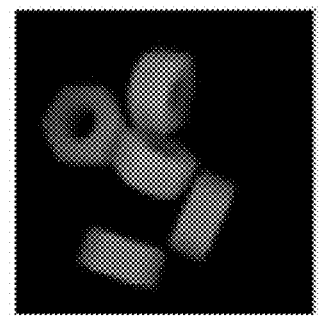
FIG. 12B
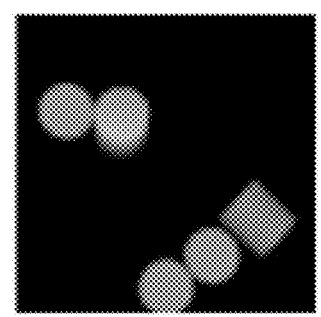
FIG. 12C
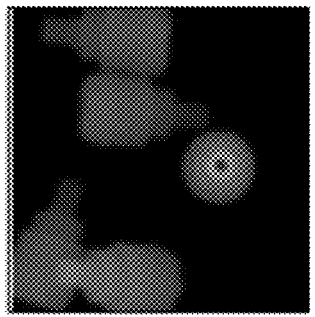

INSEGAN: A GENERATIVE APPROACH TO INSTANCE SEGMENTATION IN DEPTH IMAGES

FIELD

The present disclosure relates generally to generating verisimilar depth images to real depth image, and more particularly to, automatically segmenting multiple instances of a rigid object in depth images, while unsupervised using a three-dimensional generative adversarial network.

BACKGROUND

Instance segmentation is an essential step in a variety of autonomous tasks. For example, segmenting object instances (e.g., cars) in a scene is key to automated driving, object counting is necessary for visual reasoning, and identifying instances of an organ in medical images is important for automated diagnosis.

Conventional approaches to instance segmentation are based on object recognition and semantic segmentation models. These conventional models are assumed to have access to an annotated training set, consisting of either bounding boxes of objects or their class segmentation masks, to train a deep learning model. However, such an approach is not generalizable when annotation is difficult to obtain, or such approaches are much too computationally expensive for participants in the computer vision industry arena. For example, an industrial robot that is designed to pick arbitrary objects, or a robot-assistant in a food factory where the food item to be handled changes from week to week, as usually training a neural network for reliably predicting instances requires a large annotated training set, which can be expensive to obtain, or a model trained for one shape of objects may not be used to detect other shapes, thus making the trained model not generalizable.

Some conventional approaches address an instance segmentation problem for 2D and 3D images in a supervised manner by inputting training image data, the model consists of either bounding boxes of objects or their class segmentation masks. However, these conventional approaches are too computationally expensive when faced with complicated scenes. Another problem with these conventional approaches and many other conventional instance segmentation methods is with the training data. For example, the training image data is generated in such a way that fails in the generation of verisimilar images or fake images to the real depth image. For example, training image data is generated in such a way that lacks any real quality to the real image, and results in a domain shift problem where there is a different distribution of data in the target domain (verisimilar image or fake image) compared to the source domain (real image). Of the many problems with these convention approaches having domain shift problem, at least one reason is because instance segmentation model learns to identify an object based on identifying the object that is a refined rendering of a synthetic object that does not appear the same in a real-world. In fact, many conventional methods fail when attempting to process a complicated scene such as in a food factory. For example, in a robot pick and place food application in the food factory arena, the type of food item to be handled by the robot is randomly dropped into a bin, and where the type of food item to be handled can change daily or weekly. These conventional approaches take cannot process such complicated scenes resulting in being too computationally expensive for today's compute vision industry participants.

The conventional instance segmentation approaches of today need to provide more efficient solutions to achieve the expectations demanded by today's computer vision industry participants, such as designing approaches that include the following: (a) approaches that do not require segmentation labels or CAD models; (b) a generative learning model that does not require camera parameters; (c) approaches that are reliable and stable when processing complicated scenes; (d) approaches that are flexible in learning automatically segment multiple (identical) instances of an object in a bin in an unsupervised manner, etc.

Therefore, there is a need for generating verisimilar images from real depth image, and more particularly to, automatically segmenting multiple instances of a rigid object in depth images, while unsupervised using a three-dimensional generative adversarial network.

SUMMARY

The present disclosure relates generally to generating verisimilar images to real depth images, and more particularly to, automatically segmenting multiple instances of a rigid object in depth images, while unsupervised using a three-dimensional generative adversarial network.

The embodiments of the present disclosure provide a modified generative adversarial network (GAN) for segmenting instances of identical rigid objects in depth images. In contrast to prior methods, the present disclosure includes a uniquely created instance segmentation GAN (InSeGAN) approach that does not need any segmentation labels, camera parameters, or CAD models for training. Instead, InSeGAN approach uses only a set of depth images, each containing multiple instances of an object.

The embodiments of the present disclosure are configured for automatically segmenting multiple instances of a rigid object in depth images, while being unsupervised, which is a novel approach in the computer vision arena. The embodiments of the present disclosure are configured to perform for a myriad of applications including robot-assistive tasks. For example, to pick an object from clutter, a robot needs the instance segments to properly plan a grasp.

Some embodiments of the present disclosure include an architecture of InSeGAN that follows some aspects of the generative adversarial framework, however, the InSeGAN is redesigned to include some unlikely features that conventional GAN designers would not think of incorporating into a GAN. At least one goal in the InSeGAN is to design a learning model only using training depth images (without any labels) having identical instances as instances of the real depth image. So that at test time when given the real depth image of multiple instances of a three-dimensional (3D) object, the learned model outputs segmentation masks associated with each instance in the real depth image.

At least one realization gained from experimentation is that training image data should be training depth images having identical instances as instances of the real depth image of the object, as the trained model learns to produce instances similar to the ones in the training images, in an unsupervised manner. InSeGAN allows learning instance segmentation without any human generated labels. Further, our model can be adapted to learn any shape of instances if provided a few depth multiple instance depth images, thus allowing generalizability of the approach. Conventional approaches typically use supervised training, whereas some embodiments of the present disclosure are based on modifying aspects of standard 3D GANs approaches.

Another realization gained from experimentation is that a systematic injection of random noise helps control various attributes in image generation. This is because GANs learn distributions of training depth image data, and maps random noise distribution to the distribution of the image data. We assume that attributes in the images constitute a sub-distribution of the image distribution, and a systematically designed architecture of the GAN can allow targeting the random noise distribution towards impacting only the sub-distribution of the attributes. This targeted noise injection thus allows for disentangling attributes of the instances (e.g., pose) from other factors such as their shape or appearance. At inference time, this disentanglement thus allows for only needing to estimate the pose of the instances which simplifies the task and thus improved results, over conventional approaches. At least one reason is that conventional methods have not approached the problem from this perspective, whereas some embodiments of the present disclosure use 3D GAN architectures that is a first approach that proposes to disentangle pose from appearance for the task of single face generation or single 3D objects, that further applies it for multiple instance segmentation, in depth images.

Some embodiments include the InSeGAN designed with a generator module that, instead of taking a single noise vector as input (as in standard GANs), the generator module takes noise vectors, and each noise vector of d-dimensions from a standard normal distribution, and generates a multiple-instance depth image as output, as noted above. In other words, the InSe GAN is configured to capture a latent 3D representation of the 3D object using an implicit template implemented as a parameter tensor, produce a 3D pose transformation matrix from a noise vector using a pose encoder implemented as a first neural network. So as to generate a fake depth image using a generator implemented as a second neural network configured to apply multiple 3D transformation matrices, produced by the first neural network using multiple noise vectors, on the implicit template. It should be noted that in some cases, "Pose Encoder" may be referred to as "Pose Decoder", and "Instance Encoder" may be referred to as "Instance Pose Encoder".

At least one benefit of taking the multiple random noise vectors (equal to the number of instances) as input to produce instance-specific feature maps, such that when training the model in a generative-adversarial setting, the InSeGAN framework implicitly forces the generator to capture the distribution of single object instances. Which are merged and rendered to produce a multiple-instance depth images. These images are then fed to a discriminator that distinguishes them from the distribution of the ground-truth data.

Some embodiments of the present disclosure include a discriminator module trained to distinguish whether the input is an image generated by the generator, or a sample from the data distribution. The generator module and discriminator module can be trained, by non-limiting example, in a min-max adversarial game so that generator module can learn to generate images that can fool discriminator module, while discriminator module can be in turn trained to distinguish whether its inputs are real or fake; the optimum occurs when discriminator module cannot recognize whether its input is from generator module or the discriminator module.

When using the trained model for instance segmentation, an image encoder takes as input a generated image and is trained to reproduce the instance noise vectors; these vectors are individually decoded by the generator to form single object instances. The encoder can be an encoder module that is an important factor to achieving instance segmentation. Specifically, the encoder module takes as input a generated depth image, and outputs the latent noise vectors. The essence of InSeGAN is to have the generator produce depth images for which the instance segments are implicitly known, so that the encoder module can be trained on them to learn to disentangle the instances. In the limit that the generated distribution coincides with the real data distribution as guided by the discriminator, the encoder module will eventually learn to do instance segmentation on real images from the training depth images.

The presented InSeGAN is a novel 3D GAN that solves the conventional problem of unsupervised instance segmentation by using a generative adversarial framework. Such that by pairing the discriminator with a carefully designed generator, the model can reconstruct single object instances even under clutter and severe occlusions; the learned model when encoded can be used to achieve instance segmentation. Based upon extensive experimental testing of the InSeGAN, the results in achieving state-of-the-art instance segmentation performance, illustrated performance that outperformed prior methods by large margins.

Some main contributions of novelty of the embodiments of the present disclosure can include designing a 3D GAN architecture that can learn to segment identical instances of objects in a bin in an unsupervised manner. Wherein the InSeGAN framework takes as input multiple noise vectors. Further, a customized designed generator or the single instance generator, that learns distribution of appearances of a rigid object from a cluttered scene consisting of multiple identical instances. Another aspect includes the depth renderer, that takes aggregated feature maps of single instances and renders a multiple instance depth image. Further still, is a discriminator that takes depth images as input and learns to discriminate if the generated image consists of an exact number of instances as in the ground truth images. Another aspect is that the customized encoder that takes as input a generated multiple instance depth image and produces as output the individual noise vectors that generated the image. Yet, another aspect is a depthwise pooling scheme that aggregates single instance depth images, aggregates them through z-buffering, applies a threshold, and finds the instance segmentation masks. Further still, is a pose encoder, that takes a noise vector and produces an axis-angle representation of the 6D pose of an instance. Another aspect is a 3D feature map template that renders single instances of the object from arbitrary 6D poses produced by the pose encoder.

According to an embodiment of the present disclosure, a system for generating verisimilar images from real depth images. The system including a processor connected to a transceiver and data storage, and computer readable instructions that, when executed by the processor, cause the processor to receive a real depth image with instances of an object, via the transceiver. Train a generative adversarial neural network (GAN) having a generator, a discriminator and a pose encoder, during a training period. The training period includes access training depth images from data storage. Wherein the training images having identical instances as the instances of the real depth image. Input the training depth images in the generator to generate estimated depth images representing an implicit three-dimensional model of the object. Input, simultaneously, each estimated depth image into the discriminator and the pose encoder. The discriminator discriminates each estimated depth image against the real depth image to obtain a discriminator loss.

The pose encoder generates a set of pose transformation matrices that are matched to a set of sampled transformation matrices to obtain a matching loss. Iteratively repeating the process on the estimated depth images, until the discriminator loss and the matching loss are minimized to a threshold, to end the training period. Identify the instances in the real image by inputting the real image into the pose encoder of the trained GAN, to produce a pose transformation matrix for each instance in the real image. Wherein each pose transformation matrix is used to generate a depth image for each instance. Identify pixels in the depth images corresponding to the instances of the real image, by identifying a set of pixels in each depth image, based on a predetermined pixel depth threshold. Merge the sets of pixels for the depth images to form an instance segmentation map for the real depth image.

According to another embodiment of the present disclosure, a method for producing 3D object instance segmentation by generating verisimilar images from real depth images. The method including receiving a real depth image with instances of an object. Training a generative adversarial neural network (GAN) during a training period, the GAN having a generator, a discriminator, and a pose encoder. During the training period, accessing training depth images from data storage. The training depth images having identical instances as the instances of the real depth image. Inputting the training depth images in the generator to generate estimated depth images representing an implicit three-dimensional model of the object. Inputting, simultaneously, each estimated depth image into the discriminator and the pose encoder. The discriminator discriminates each estimated depth image against the training depth images to obtain a discriminator loss. The pose encoder generates a set of pose transformation matrices that are matched to a set of sampled transformation matrices, to obtain a matching loss. Repeating, iteratively, the process on the estimated depth images, until the discriminator loss and the matching loss are minimized to a threshold, to complete the training period. Identifying the instances in the real depth image by inputting the real depth image into the pose encoder of the trained GAN to produce a pose transformation matrix for each instance in the real depth image. Wherein each pose transformation is used to generate a simulated depth image for each instance in the real depth image. Identify pixels in the simulated depth images corresponding to the instances of the real depth image, by identifying a set of pixels in each simulated depth image, based on a predetermined pixel depth threshold. Merge the sets of pixels corresponding to the same instance in the simulated_depth image, to produce an instance segmentation map of verisimilar images for the real depth image.

According to another embodiment of the present disclosure, a system for object-instance segmentation on a depth image consisting of identical instances of a 3D object. The system including a processor and a memory with computer code instructions stored thereon, the processor and the memory, with the computer code instructions, configured to cause the system to capture a latent 3D representation of the 3D object using an implicit template implemented as a parameter tensor. Produce a 3D pose transformation matrix from a noise vector using a pose encoder implemented as a first neural network. Generate a fake depth image using a generator implemented as a second neural network configured to apply multiple 3D transformation matrices, produced by the first neural network using multiple noise vectors, on the implicit template. Use a discriminator implemented as a third neural network to distinguish a real depth image from the fake depth image and output a discrimination result as a function thereof. Decompose the fake depth image into latent vectors using an instance encoder implemented as a fourth neural network. The instance encoder outputs a set of latent vectors that match the set of noise vectors used in the pose encoder. Iterative operation of the implicit template, the pose encoder, the generator, the discriminator, and the instance encoder during the training period. Causes the discriminator and generator to train in an adversarial relationship with each other. Causes the generator, the implicit template, the pose encoder, and the instance encoder to train in a collaborative relationship with each other. Wherein the instance encoder at the end of the training period having its fourth neural network trained to produce latent vectors that match with the noise vectors corresponding to the 3D pose of the instances in a generated depth image with an increased amount accuracy than at the start of the training period. Wherein after the training period, given a real depth image including of multiple instances of the 3D object. The instance encoder produces latent vectors for each 3D object instance. The latent vectors are iteratively used to produce corresponding 3D transformation matrices by the pose encoder, to produce single instance depth images by the generator consisting of only one instance of the 3D object in each depth image. Wherein pixels corresponding to a valid depth in the produced single instance depth image is used as the instance segmentation.

According to another embodiment of the present disclosure, a system including a processor and a memory with computer code instructions stored thereon, the processor and the memory, with the computer code instructions, configured to cause the system to use an implicit template configured to capture a latent three-dimensional (3D) representation of a 3D object, and a pose encoder configured to produce a 3D pose transformation matrix from a noise vector. A generator configured to apply multiple 3D transformation matrices using multiple noise vectors on the implicit template to generate a fake depth image. Output the fake depth image, jointly, to a discriminator and an instance encoder. Wherein the discriminator is configured to distinguish a real depth image from the fake depth image. Output a discrimination result as a function thereof, and the instance encoder is configured to output a set of latent vectors that match the set of noise vectors used in the pose encoder. Wherein during a training period, an iterative operation trains the discriminator and generator in an adversarial relationship with each other, and trains the generator, the implicit template, the pose encoder and the instance encoder in a collaborative relationship with each other. Wherein the trained instance encoder is configured to produce latent vectors for each 3D object instance. The latent vectors are iteratively used to produce corresponding 3D transformation matrices by the trained pose encoder, to produce single instance depth images by the trained generator that include only one instance of the 3D object in each depth image. Wherein pixels corresponding to a valid depth in the produced single instance depth image is used as the instance segmentation.

Further, some embodiments of the present disclosure can provide a robotic system for manipulating an object. The robotic system may include a robotic arm having a manipulator configured to handle the object, wherein the manipulator comprises: a twist configured to ensure multiple degrees of freedom of moving the object; an end-tool configured to hold the object; an imaging device configured to measure start and/or goal poses of the robotic arm for successfully manipulating the object; and a robotic controller that comprises: a processor connected to a transceiver and data storage, and computer readable instructions including a trainable generative adversarial neural network (GAN) having a trainable generator, a trainable discriminator and a trainable pose encoder that, when executed by the processor, cause the processor to receive real depth images with multiple instances of an object, via the transceiver; input, simultaneously, each estimated depth image is input into the discriminator and the pose encoder, the discriminator discriminates each estimated depth image against the real depth image to obtain a discriminator loss, and the pose encoder generates a set of pose transformation matrices that are matched to a set of sampled transformation matrices to obtain a matching loss; iteratively repeating the process on the estimated depth images, until the discriminator loss and the matching loss are minimized to a threshold, to end the training period; identify the instances in the real image by inputting the real image into the pose encoder of the trained GAN, to produce a pose transformation matrix for each instance in the real image, wherein each pose transformation matrix is used to generate a depth image for each instance; and identify pixels in the depth images corresponding to the instances of the real image, by identifying a set of pixels in each depth image, based on a predetermined pixel depth threshold, and merge the sets of pixels for the depth images to form an instance segmentation map for the real depth image.

Practical Applications

The present embodiments are solving a computer vision industry specific technical problem of being able to generalize when annotation is difficult, or when operating in a complex scene. Further, some embodiments of the present invention can apply to a robot (robotic system) that includes a manipulator that is configured to pick and place food items (products) in the food factory arena, where the type of food items to be picked by the robot are randomly dropped into a bin, and where the type of food item to be handled can change daily or weekly. For example, an industrial robot designed to pick arbitrary objects or a robot-assistant in a food factory are ideal situations to use this system and method due to the unique technical features of the solution, i.e., conventional methods cannot generalize when annotation is difficult or when operating in a complex scene. These conventional approaches also require segmentation labels, camera parameters, or CAD models for training, which includes further expense. Whereas, the embodiments of the present disclosure do not need any segmentation labels, camera parameters, or CAD models for training. Instead, the embodiments of the present disclosure use a InSeGAN approach that only uses a set of depth images, each containing multiple instances of an object. Other problems with the conventional approaches are the expenses of obtaining access to an annotated training set, consisting of either bounding boxes of objects or their class segmentation masks, to train a deep learning model, and that these conventional approaches typically use supervised training. Thus, in view of the above remarks, these conventional approaches become too computationally expensive as participants in the computer vision industry arena.

Some of the technical features of the embodiments of the present disclosure include using training depth images (without any labels) having identical instances as instances of the real depth image. So that at test time when given the real depth image of multiple instances of a three-dimensional (3D) object, the learned model outputs segmentation masks associated with each instance in the real depth image. Specifically, the training image data includes training depth images with identical instances as instances of the real depth image of the object, where the trained model learns to produce instances similar to the ones in the training images, in an unsupervised manner. InSeGAN allows learning instance segmentation without any human generated labels, i.e. that is unsupervised. The InSeGAN model adapts to learn any shape of instances if provided a few depth multiple instance depth images, thus allowing quickly generalizability of the approach, over that of conventional approaches. Some benefits of such technical features of the present disclosure are the reduced amount of computational time to generalize when the annotation is difficult or when operating in a complex scene, i.e. i.e. food factories, segmenting object instances (e.g., cars) in a scene to automated driving, object counting for visual reasoning, and identifying instances of an organ in medical images for automated diagnosis. Resulting in making the embodiments useful to participants in the computer vision industry arena due to having reduced computational expenses as well as overall expense, that will make participants more profitable and competitive, when compared to the conventional approaches for the reasons noted above.

Another technical feature is the systematic injection of random noise helps control various attributes in image generation. This is because GANs learn distributions of training depth image data, and maps random noise distribution to the distribution of the image data. We assume that attributes in the images constitute a sub-distribution of the image distribution, and a systematically designed architecture of the GAN can allow targeting the random noise distribution towards impacting only the sub-distribution of the attributes. This targeted noise injection thus allows for disentangling attributes of the instances (e.g., pose) from other factors such as their shape or appearance. At inference time, this disentanglement thus allows for only needing to estimate the pose of the instances which simplifies the task and thus improved results, over conventional approaches. Another technical features is designing the InSeGAN with a generator module that, instead of taking a single noise vector as input (as in standard GANs), the generator module takes noise vectors, and each noise vector of d-dimensions from a standard normal distribution, and generates a multiple-instance depth image as output, as noted above. In other words, the InSe GAN is configured to capture a latent 3D representation of the 3D object using an implicit template implemented as a parameter tensor, produce a 3D pose transformation matrix from a noise vector using a pose encoder implemented as a first neural network. So as to generate a fake depth image using a generator implemented as a second neural network configured to apply multiple 3D transformation matrices, produced by the first neural network using multiple noise vectors, on the implicit template.

These above additional limitations reflect an improvement in the technical field of computer vision systems, that integrate features and aspects into a practical application, and these technical features (i.e., (1) using training depth images (without any labels) having identical instances as instances of the real depth image, (2) systematic injection of random noise helps control various attributes in image generation, etc., as describe above), and aspects, are integrated into and provide meaningful limitations to the technical solution for the technical problem.

For example, some of the meaningful limitations include: (1) the reduced amount of computational time to generalize when the annotation is difficult or when operating in a complex scene; and (2) allows for disentangling attributes of the instances (e.g., pose) from other factors such as their shape or appearance. At inference time, this disentanglement thus allows for only needing to estimate the pose of the instances which simplifies the task and thus improved results, over conventional approaches, by non-limiting example.

Thus, the systems and methods as a whole cannot be viewed merely as performing aspects in the human mind, nor gathering (collecting) data, processing data, analyzing data, and displaying certain results, in terms of being abstract. In contrast, the systems and methods can generalize when annotation is difficult, or when operating in a complex scene at less expense and computational expense and can be competitive and profitable for participants in the computer vision industry and other industries.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIG. 2A, FIG. 2B and FIG. 2C are pictures of segmentations and A, B, C, D and E are single instances disentangled by InSeGAN on a Nut instance depth image from a training depth image dataset, according to some embodiments of the present disclosure;

FIG. 3A, FIG. 3B and FIG. 3C are pictures of segmentations and A, B, C, D and E are single instances disentangled by InSeGAN on a Cone instance depth image from a training depth image dataset, according to some embodiments of the present disclosure;

FIG. 5A shows the input image into the InSeGAN; FIG. 5B shows the generated and rendered image which is the synthesized image by InSeGAN corresponding to the real depth image in FIG. A; FIG. 5C and FIG. 5D show the instance segmentations and a single instance of one of the nuts in FIG. A rendered independently by the single instance generator at test time, according to some embodiments of the present disclosure;

FIG. 11 shows Table 1 illustrating results of an Ablative study on the various losses used in the InSeGAN generator and the mIoU achieved on two classes, according to some embodiments of the present disclosure;

FIG. 12A, FIG. 12B and FIG. 12C show results from InSeGAN, according to some embodiments of the present disclosure;

DETAILED DESCRIPTION

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

FIGS. 1A to FIG. 1D are schematics illustrating an example of a training scheme in a three-dimensional (3D) generative adversarial network (GAN) (3D-GAN) which is termed as an instance segmentation (Se) generative adversarial network (GAN) or (InSeGAN), according to some embodiments of the present disclosure.

As discussed further below there are three distinct control flows in the framework. FIG. 1B illustrates the first control flow that captures the generative process producing a multiple instance depth image. FIG. 1C illustrates the second control flow (black dotted lines) showing the scheme to encode a generated depth image to its instances. FIG. 1D illustrates the third control flow (black dash dot lines) illustrate the control flow to train the Instance Encoder via using the encoded latent vectors to re-create the already generated image.

Some embodiments disclose $\chi$ as a given training dataset, where each $x \in \chi$ is a training depth image consisting of n instances of a rigid object. To simplify the notation, we will use $\chi$ to also characterize the distribution of x. We assume that n is known and fixed for $\chi$. Technically, an aspect of this framework can work even if there is a different n for each depth image. However, to simplify this exposition, an approach that is used is to assume that n is to be fixed and known for the full dataset. There may be a way to infer n from data for a given image using additional learning modules in the pipeline configured for some embodiments.

Figure 1A:
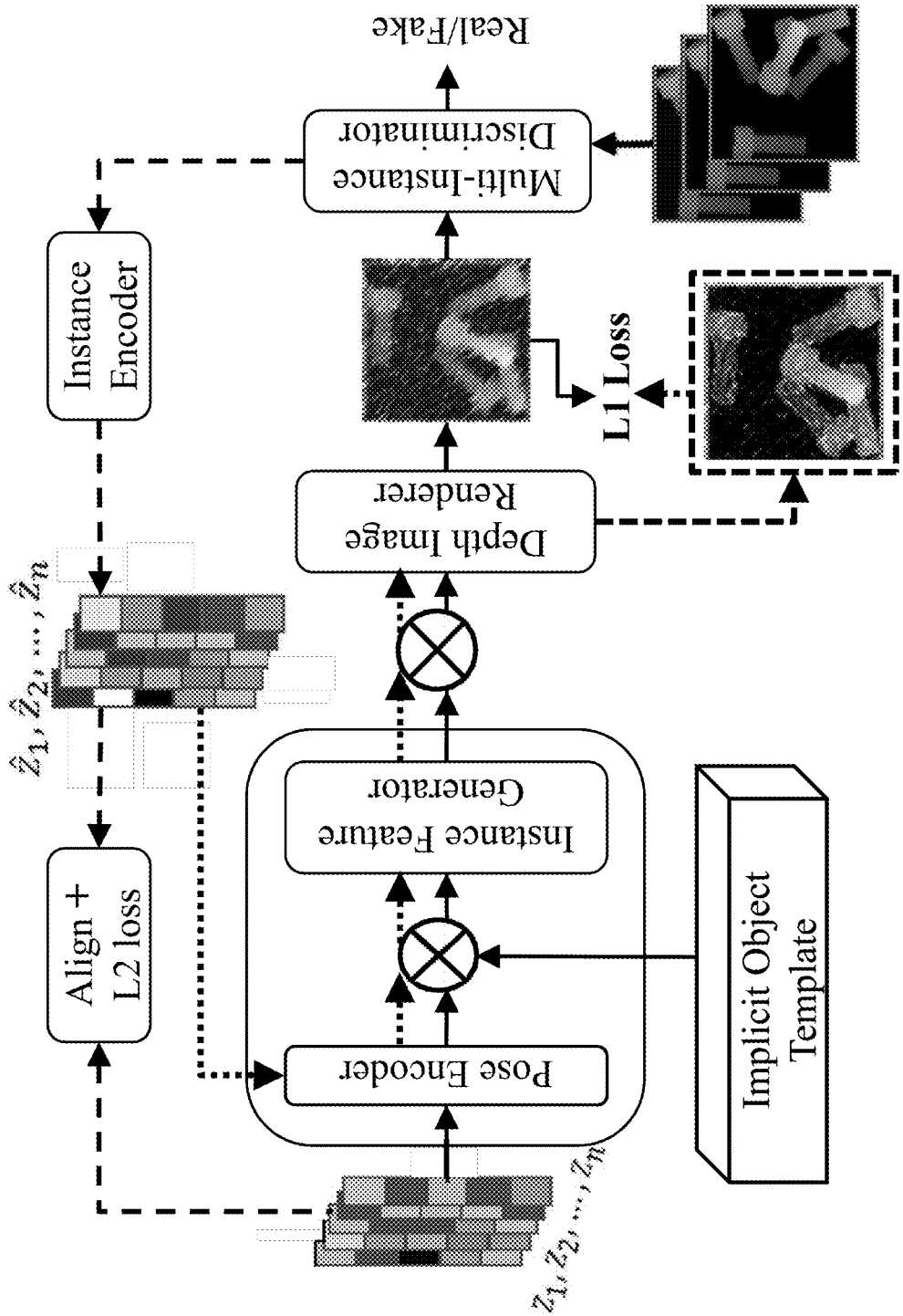
FIG. 1A is a schematic illustrating of an example of a training scheme in a three-dimensional (3D) generative adversarial network (GAN) (3D-GAN) which is termed, an instance segmentation (Se) generative adversarial network (GAN) or (InSeGAN), according to an embodiment of the present disclosure.
Figure 1B:
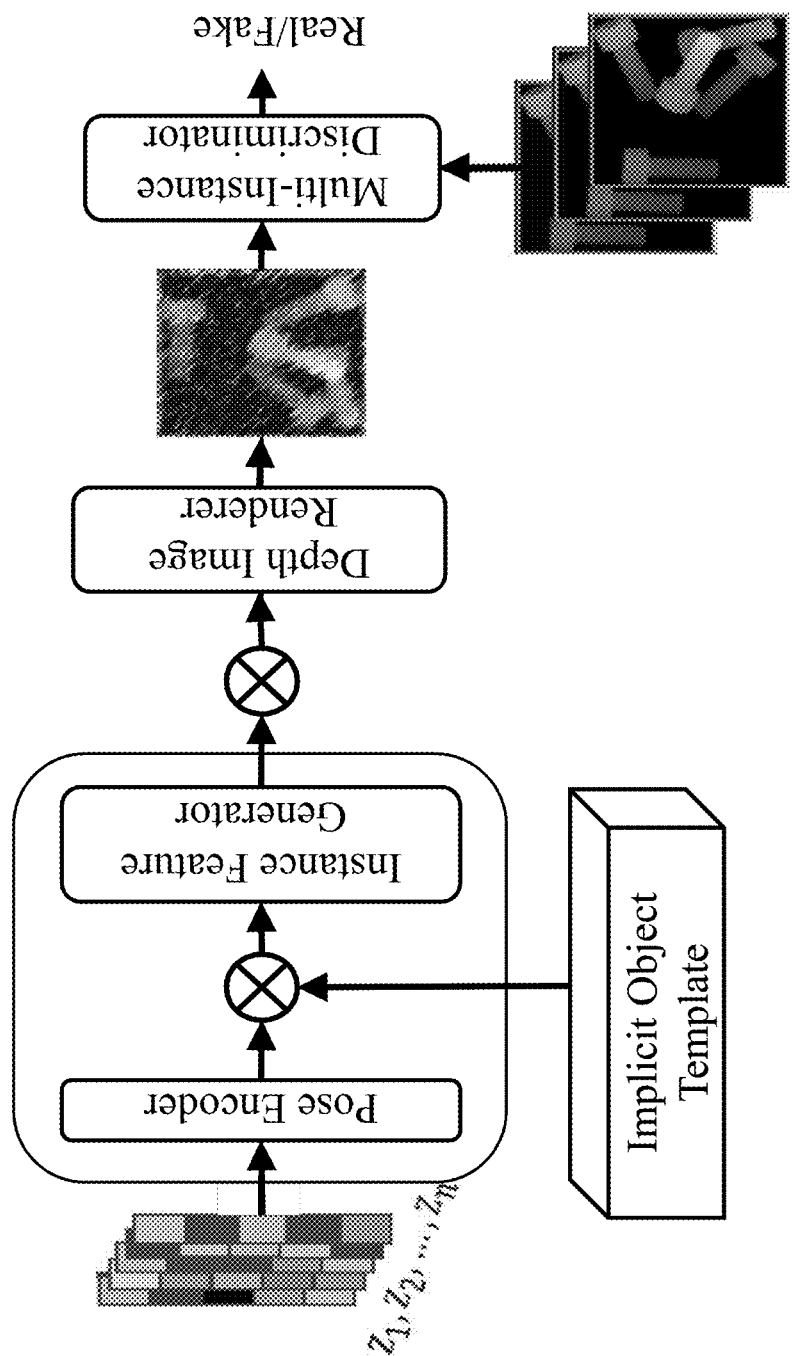
FIG. 1B is a schematic illustrating an example of some method steps of FIG. 1A of a first control flow, showing the generative process producing a multiple instance depth image, according to some embodiments of the present disclosure.
Figure 1C:
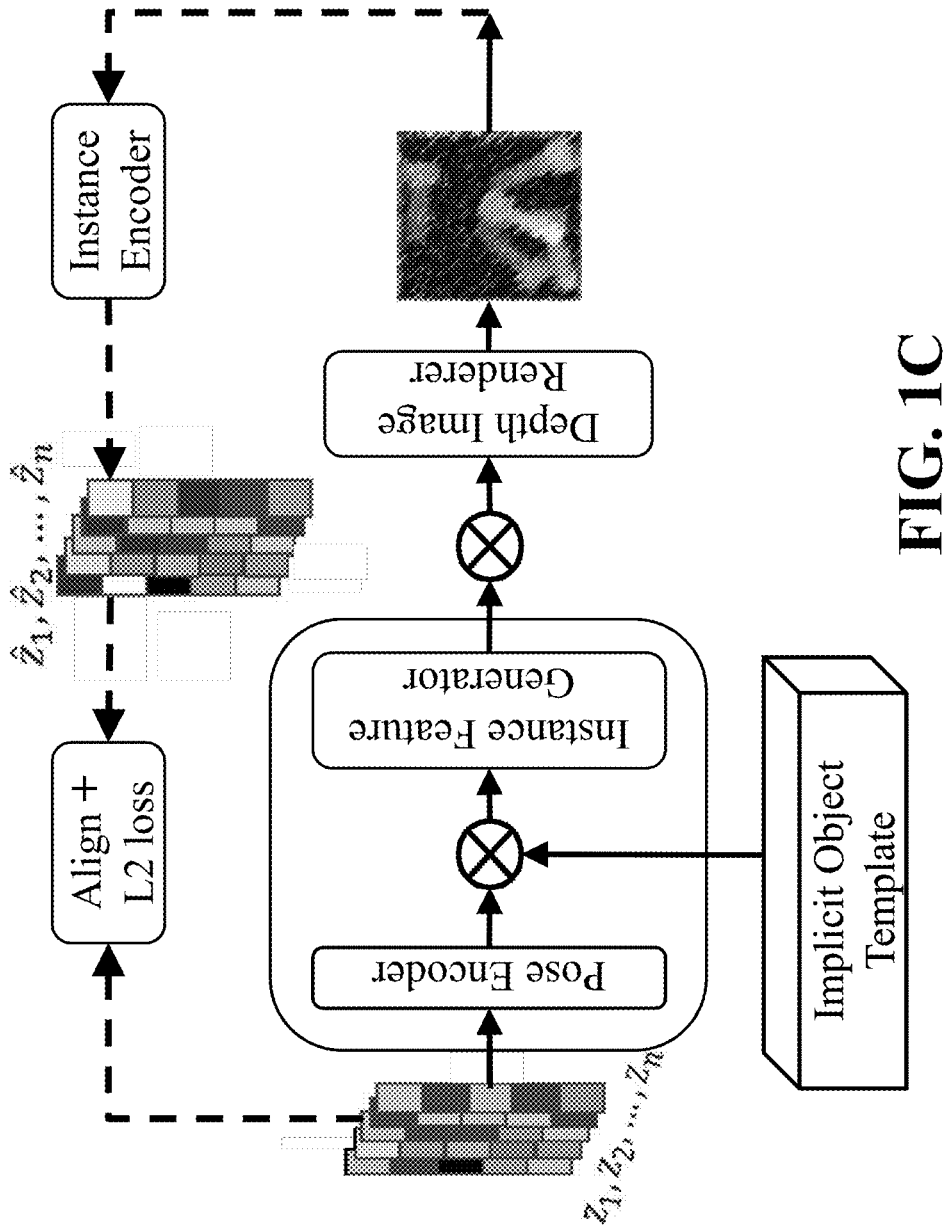
FIG. 1C is a schematic illustrating an example of some method steps of FIG. 1A of a second control flow, showing a scheme to encode a generated depth image to its instances, according to some embodiments of the present disclosure.
Figure 1D:
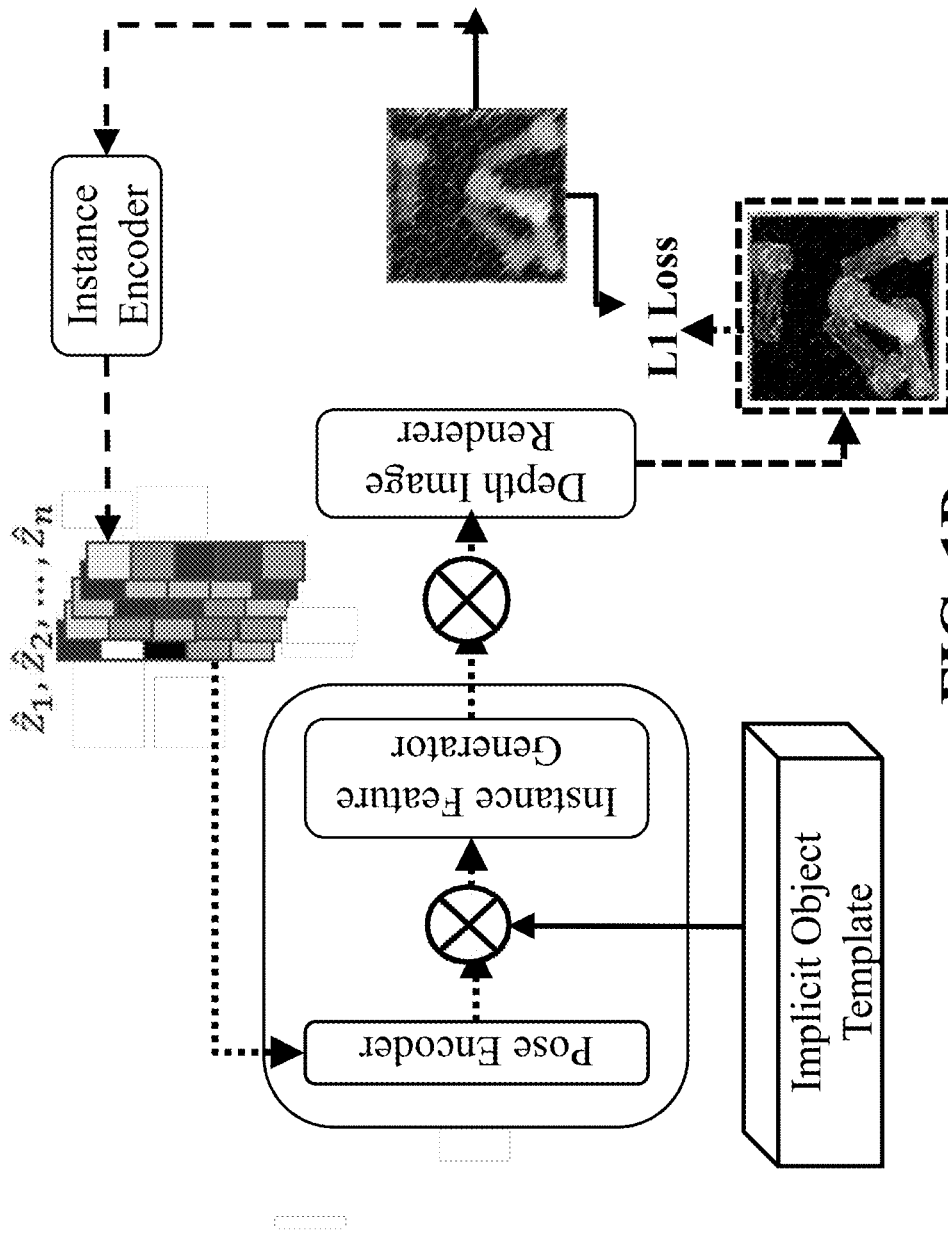
FIG. 1D is a schematic illustrating an example of some method steps of FIG. 1A of a third control flow, showing a control flow to train Instance Encoder via using encoded latent vectors to re-create the already generated image, according to some embodiments of the present disclosure.

Referring to FIG. 1A, at least one goal in InSeGAN is then to design a learning model only using $\chi$(without any labels) such that at test time when given a depth image x, the learned model outputs the segmentation masks associated with each instance in the depth image.

An overview of the InSeGAN begins with discussing the basic architecture of InSeGAN that follows a standard generative adversarial framework, however with several non-trivial twists. It consists of a generator module G that, instead of taking a single noise vector as input (as in standard GANs), the generator module G takes n noise vectors, $\{z_1, z_2, \ldots, z_n\}$, each $z \in \mathbb{R}^d \sim N(0, I_d)$, and generates a multiple-instance depth image as output, i.e., G: $\mathbb{R}^{d \times n} \to \hat{\chi}$, where $\hat{\chi}$ is used to signify the distribution of the generated depth images, with the limit $\hat{\chi} \to \chi$ when G is well-trained. We denote the set of noise vectors by the matrix $Z \in \mathbb{R}^{d \times n}$ and the distribution of Z as $\bar{z} = \{N(0, I_d)\}^n$. Next, a discriminator module D is trained to distinguish whether its input is an image generated by G or a sample from the data distribution. The modules G and D are trained in a min-max adversarial game so that G learns to generate images that can fool D, while D is in turn trained to distinguish whether its inputs are real or fake; the optimum occurs when D cannot recognize whether its input is from G or $\chi$. Apart from the generator and the discriminator modules, we also have an encoder module E that is key to achieving instance segmentation. Specifically, E takes as input a generated depth image, and outputs the latent noise vectors, i.e., E: $\hat{\chi} \to \mathbb{R}^{d \times n}$. The essence of InSeGAN is to have the generator G produce depth images for which the instance segments are implicitly known (through Z), so that E can be trained on them to learn to disentangle the instances. In the limit that $\hat{\chi} \to \chi$, as guided by the discriminator D, E will eventually learn to do instance segmentation on real images from $\chi$. An overview of the InSeGAN training pipeline is shown in FIGS. 1A, FIG. 1B, FIG. 1C and FIG. 1D. Next, we will describe each of the modules in greater detail.

Referring to FIGS. 1A, FIG. 1B and FIG. 1C, the InSeGAN generator is at least one key aspect to InSeGAN, such that having the generator G can accomplish two tasks jointly: (i) to produce a depth image $\hat{x}$ that matches the input image distribution, and (ii) to identify each object instance in the generated image $\hat{x}$. To this end, we note that sans the other instances, each instance is an independent depth rendering of an object in an arbitrary 6D pose. A multiple-instance depth image may be generated by merging the individual instances, followed by depth-based inter-object occlusion reasoning.

Motivated by the above insight, at least one another realization realized was to segregate the generator G to have two distinct modules: (i) an instance generator that generates feature maps for single object instances, and (ii) a depth image rendering module that aggregates the single-instance features and renders the multiple-instance depth image. As the instances are assumed to be of the same object, we propose to sample each noise vector $z \in Z$ from the same latent distribution, $z \sim N(0, I_d)$. Further, we assume that there exists an implicit (and learned) 3D object model (template) that, when geometrically transformed, produces the varied appearances of the instances.

Still referring to FIGS. 1A, FIG. 1B, FIG. 1C and FIG. 1D, in that a first step in the generator pipeline can be to produce 6D geometric transforms that can be applied to a template to render the implicit instances of the object. To this end, each noise vector $z \in Z$ is converted to an element of the special Euclidean group (SE(3)) using a Pose Encoder module (see FIG. 1A and FIG. 1C) which is a fully connected neural network, de-noted $G_p$: $\mathbb{R}^d \to \mathbb{R}^6$. In details, $G_p$ produces an axis-angle representation corresponding to a given noise vector z; this representation is next converted to an element in the Special Euclidean group, SE(3). We denote this operator by $\Lambda$: $\mathbb{R}^6 \to SO(3) \times \mathbb{R}^3$, i.e, $\Lambda$ produces a rotation matrix $R \in SO(3)$ and a translation vector in $t \in \mathbb{R}^3$. A natural question in this context is why we do not sample the transformation matrix directly. This is because, as will be clear shortly, we need to match the output of the encoder module E with the representations of the instances; and having a Euclidean noise vector is computationally more efficient in using a similarity measure than using a rotation matrix that lies on a nonlinear geometric manifold.

Next, we use the transformation matrix thus created, i.e., $\Lambda(G_p(z))$, to geometrically transform an implicit shape tensor $T \in \mathbb{R}^{h \times h \times h \times k}$; this parameter tensor is shared by all the instances and will, when trained (with the other modules in the pipeline), implicitly capture the shape and appearance of the object. A Spatial Transformer Network (STN) is used to apply the geometric transform to this implicit template. The transformed T is reshaped to $\mathbb{R}^{kh \times h \times h}$ and projected from 3D to 2D using a single-instance projection module $G_s$ to output $\hat{x}_f \in \mathbb{R}^{c \times h \times h}$ capturing the feature map representation of an instance. The above steps can be formally written as:

$$\mathcal{F}(z) := G_s(STN(\Lambda(G_p(z)),T)). \tag{1}$$

Still referring to FIG. 1B, next is proposed to combine these feature maps by average pooling them, to render a multiple-instance depth image using a rendering module Gr, as follows:

$$\hat{x} = G(Z) := G_r(\bar{\mathcal{F}}) \text{ where } \bar{\mathcal{F}} = \frac{1}{|Z|} \sum_{z \in Z} \mathcal{F}(z), \tag{2}$$

where $\hat{x}$ denotes a depth, image generated by G. We will denote the distribution of generated images as $\hat{\chi}$. This generative control flow is depicted using black arrows in FIG. 1C.

Referring to the InSeGAN discriminator, noted is that as in standard GANs, the task of the discriminator D is to decide whether its input comes from the distribution of natural multiple instance depth images (i.e., χ) or is synthesized by our generator G (i.e., $\tilde{\chi}$). Following standard architectures, D consists of several 2D convolution, instance normalization, and LeakyRELU layers, and outputs a classification score, i.e., [0, 1]. The objectives for training the discriminator and generator, respectively, are to minimize the following losses:

$$\mathcal{L}_D := -\mathbb{E}_{x \sim \chi} \log(D(x)) - \mathbb{E} \log(1 - D(G(Z))), \mathcal{L}_G := -\mathbb{E} \log D(G(Z)). \quad (3)$$

The task for our discriminator is significantly different from prior works, as it must learn to: (i) count whether the number of rendered instances matches the number of instances in the data distribution, (ii) verify whether the rendered 3D posed objects obtained via transforming the still-to-be-learned object template $T$ capture individual appearances (which are also being learned) of the instances, and (iii) whether the layout of the rendered image is similar to the compositions of the instances in the data depth images. Fortunately, with access to a sufficiently large dataset, D can automatically achieve these desired behaviors when adversarial trained with the generator.

Still referring to FIG. 1B, the InSeGAN encoder can now be introduced as an Encoder module E that is the key to instance segmentation. The task of this module is to take as input a multiple-instance depth image $\hat{x}$ produced by G and reconstruct each of the noise vectors in Z that were used to generate it. Let us assume the encoder outputs $\hat{Z}$, a set of latent vectors. Indeed, as $\hat{x}$ is produced by aggregating n independently sampled instance appearances of the object, inverting the process is amounts to disentangling $\hat{x}$ into its respective instances, and when the generator is trained well, i.e., $\hat{x} \approx x$, we will eventually learn to disentangle each in-stance in a ground truth image. While this idea is conceptually simple, implementing it practically is not straightforward. There are four main difficulties: (a) the input Z to the generator and the output $\hat{Z}$ of E are unordered sets, and need to be aligned before comparing them, (b) the average pooling operator in (2) aggregates several feature maps into one, an operation that loses the distinctiveness of each of the instance feature maps, (c) the depth renderer $G_r$ may remove occluded parts of the instances, thus posing ambiguities when mapping them back to the noise vectors, and (d) the pose encoder $G_p$ projects its noise input to the space of rigid body transforms, an operation that is inherently low-rank and nonlinear. We tackle these challenges via imposing losses on the encoder so that it learns to invert each module in the generator. Let us assume that the encoder E has two sub-modules: (i) an image derenderer $G_r^{-1}$ that takes a depth image and produces feature maps, and (ii) an instance decoder $G_s^{-1}$ that takes the feature maps from $G_r^{-1}$ and produces $\hat{Z}$.

Alignment and Reconstruction: To tackle our first difficulty, we propose to align the noise sets Z and $\hat{Z}$ before computing a reconstruction loss on them. Specifically, we seek to find an alignment matrix $\pi \in \Pi(Z, \hat{Z})$, where $\Pi$ denotes the set of all such alignments (i.e., permutations) on its inputs, such that the reconstruction loss is minimized:

$$\mathcal{L}_E^a = \|Z - \pi^*(\hat{Z})\|^2, \text{ where } \pi^* = \underset{\pi \in \Pi(Z,\hat{Z})}{\arg\min} OT(\pi, D(Z, \hat{Z})), \quad (4)$$

where D denotes the pairwise distances between the columns in Z and $\hat{Z}$, and OT is some suitable matching scheme.

We use a general-purpose optimal transport (IPOT [33]) scheme to implement the alignment, which returns a permutation matrix $\pi^*$ that is used to align the matrices before comparing them using the $\ell_2$ distance. We show this encoder control flow using solid red arrows in FIG. 1D.

Intermediate Reconstruction: Still referring to FIG. 1C, to tackle difficulties (b) and (c) in the encoder design, which involve E learning to invert the depth renderer, we use the output from the derenderer sub-module $G_r^{-1}$ in E. Specifically, $G_r^{-1}$ is forced to reconstruct the average-pooled feature map $\bar{\mathcal{F}}$ in (2). Let us denote this loss by $\mathcal{L}_E^i = \|\bar{\mathcal{F}} - G_r^{-1}(\hat{x})\|^2$.

Pose Decoding: Although one could apply the above intermediate feature decoding strategy even to the pose encoder $G_p$, it would not be very efficient to compare its output $\Lambda(G_p(\hat{Z}))$ to the rigid transforms produced during the generative process. This is because the geometric matrix that $\Lambda$ produces involves a rotation matrix, and thus optimizing would ideally require Riemannian optimization methods in the space of SO(3), which is not well suited for standard optimization schemes. Further, there may be several different geometric transformations that could achieve the same output. To avoid this technicality, we propose to learn the rigid transform indirectly, by avoiding exact reconstruction of the transform and instead asking it to have the desired outcome in the generative process. Specifically, we propose to use the $\hat{Z}$ produced by the encoder, and use it as a noise matrix to produce a depth image $G(\hat{Z})$; this depth image is then compared with the depth image generated in the previous pass using Z. The following loss, $\mathcal{L}_E^p$, captures this idea:

$$\mathcal{L}_E^p = \|G(Z) - G(E(\hat{x}))\|_1. \quad (5)$$

The above control flow is illustrated in FIG. 1C by the dotted red arrows that go from noise vectors $\hat{z}$ to the pose encoder and over to the depth renderer, i.e., the output of G.

Encoder Loss: Still referring to FIG. 1D, we combine the above three losses when training the parameters of the encoder module (see the supplementary materials for details on its architecture):

$$\mathcal{L}_E = \mathcal{L}_E^a + \lambda_1 \mathcal{L}_E^i + \lambda_2 \mathcal{L}_E^p, \quad (6)$$

where the λ's provides weights to each type of loss. When backpropagating the gradients on the encoder losses, we fix the generator parameters, as otherwise they will co-adapt with the encoder parameters, making training unstable.

Contemplated is that some embodiments can be configured to be used with components of a manufacturing kit, wherein the components are objects. For example, the objects of the components can be associated with specific customer and be recognized by an identifier, wherein the processor can accesses stored instructions associated with the specific customer and that, when executed by the processor, cause the processor to: (a) access a list of expected components of the manufacturing kit and based upon the identifier, confirm that the specific customer is the client; (b) compare the list to a customer database to verify the list of expected ordered components are to be delivered within a time period to the specific customer, per a time appropriate request; and (c) upon confirming the delivery time period, identify differences between the list of expected components to the first customer database of the objects. The customer database can include other data associated with the customer including other types of components, other manufacturing businesses associated with other types of information.

Also contemplated is that some embodiments may be configured with a client's check-in system. Dependent upon the clients needs some embodiments can be configured to associate an identity of a customer with bins containing objects. The bins can be tagged with identifiers such that the check-in system can read the identifier to obtain information about the client, client order, etc. The identifier is that which is common within the manufacturing industries and can include one or a combination of, a radio frequency identification (RFID) transceiver, a WiFi transceiver, a badge reader, etc.

FIG. 2A, FIG. 2B and FIG. 2C are pictures of segmentations and A, B, C, D and E are single instances disentangled by InSeGAN on a Nut instance depth image from a training depth image dataset, according to some embodiments of the present disclosure.

FIG. 3A, FIG. 3B and FIG. 3C are pictures of segmentations and A, B, C, D and E are single instances disentangled by InSeGAN on a Cone instance depth image from a training depth image dataset, according to some embodiments of the present disclosure.

Figure 4:
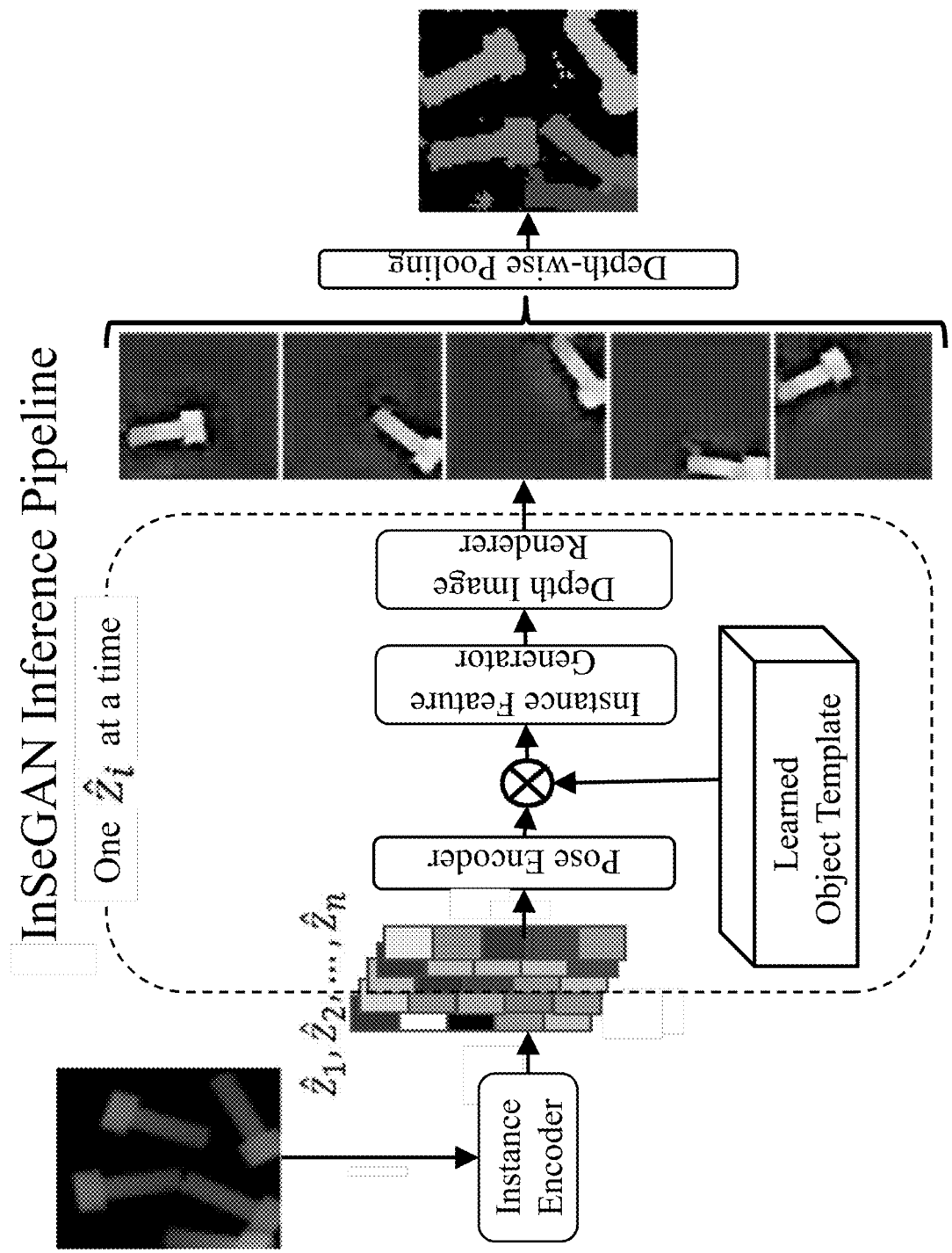
FIG. 4 shows a schematic illustrating some aspects of the InSeGAN inference pipeline, that can include inputting the multiple-instance depth image into the encoder module, which produces a set of latent vectors. Each latent vector of the set is inputted individually into the trained single-instance generator, and the output, of which, is rendered using rendering module to form a single-instance depth image that corresponds to the latent vector, according to some embodiments of the present disclosure.

FIG. 4 shows a schematic illustrating some aspects of the InSeGAN inference pipeline, that can include inputting the multiple-instance depth image into the encoder module, which produces a set of latent vectors. Each latent vector of the set is inputted individually into the trained single-instance generator, and the output, of which, is rendered using rendering module to form a single-instance depth image that corresponds to the latent vector, according to some embodiments of the present disclosure;

InSeGAN Inference: At inference time, we assume to be given only a depth image consisting of multiple instances of the rigid object; The following formula is used only at training time.

$$L = \|Z - \pi(Z')\|^2 \text{ where } \pi^* = \arg\min OT(\pi, D(Z, Z')), \quad (4)$$

our goal is to segment the instances and render each instance separately, while producing an instance segmentation on the input. To this end, our inference pipeline resembles the generative process, but with some important differences as illustrated in FIG. 4. Specifically, for inference, we input the multiple-instance depth image to the encoder module E, which produces a set of latent vectors $\hat{Z}$. Each $\hat{z} \in \hat{Z}$ is input individually into the trained single-instance generator $G_s$, the output of which is rendered using $G_r$ to form a single-instance depth image that corresponds to $\hat{z}$. We emphasize that in this phase, the depth renderer sits within the image generation phase as against in the training setting, when the renderer takes as input the aggregated feature tensor $\bar{\mathcal{F}}$. Once the single instances are rendered, as shown in FIG. 4, we use a depth-wise max pooling on these in-stance depth images for inter-instance occlusion reasoning, followed by thresholding the instances, where the threshold is decided by the average depth in the image. Thresholding removes any bias introduced during depth rendering. To produce the pixel-wise instance segmentation, we use the index of the generated instance that is selected for a given pixel.

Still referring to FIG. 4, a curious skilled artesian within the art of computer vision might ask, how can a single $\hat{z}$ decode a single object instance? This is because of the way the generator-discriminator pipeline is trained. For example, let us assume for the moment that a single $\hat{z}$ produces more than one (or in the extreme, all) of the instances in a depth image. As $\hat{z}$ is randomly sampled from a distribution, it is unlikely that only some of the elements in $\hat{Z}$ may render the instances and some do not, given that aggregation of all the generated instances should match up to the number of instances in the input, a requirement that the discriminator will eventually learn to verify in the generated images.

Further, given that the object appearances are varied, it is perhaps easier for the generator to learn to render the appearance of a single instance than to capture the joint appearance distribution for all instances, which could be a very large and diverse.

Training Pipeline: An aspect of the full framework, including the InSeGAN generator G, discriminator D, and Encoder E, minimizing for the sum of all the losses given by:

$$\mathcal{L} = \mathcal{L}_D + \mathcal{L}_E + \mathcal{L}_G. \quad (7)$$

Still referring to FIG. 4, the gradients for the various modules are computed using PyTorch autograd. We use Adam for training all our models, with a learning rate of 0.0002, $\beta 1 = 0.5$, and $\beta 2 = 0.99$.

Figure 5A:
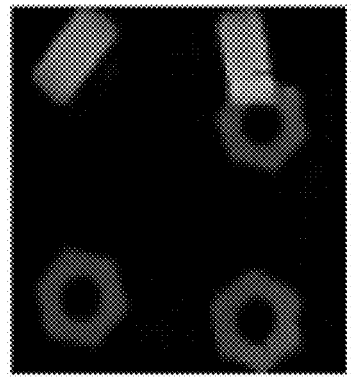
FIG. 5A to FIG. 5D are pictures illustrating qualitative results using InSeGAN on a nut from a training depth image.
Figure 5B:
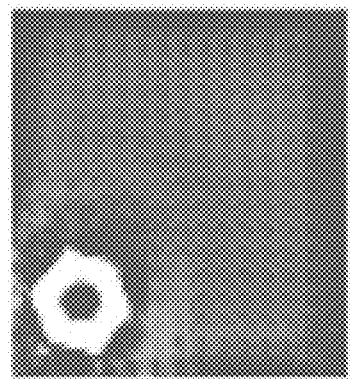
Figure 5C:
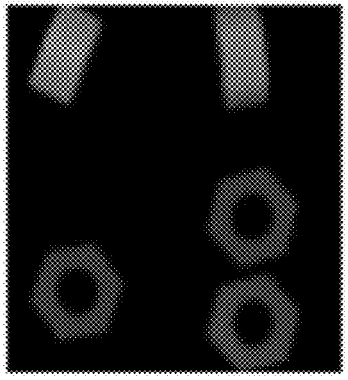
Figure 5D:
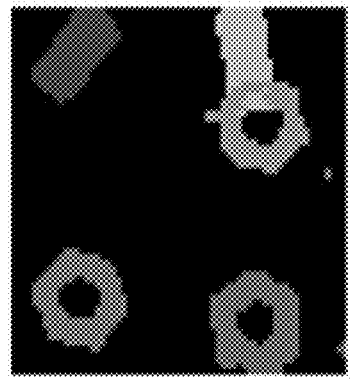

FIGS. 5A to FIG. 5D are pictures illustrating qualitative results using InSeGAN on a nut from a training depth image: FIG. 5A shows the input image into the InSeGAN; FIG. 5B shows the generated and rendered image which is the synthesized image by InSeGAN corresponding to the real depth image in FIG. A; FIG. 5C and FIG. 5D show the instance segmentations and a single instance of one of the nuts in FIG. A rendered independently by the single instance generator at test time, according to some embodiments of the present disclosure;

During experimentation, many test experiments demonstrated the empirical benefits of InSeGAN on the task of instance segmentation. We will first introduce our new dataset Insta-10 on which our experiments are based, followed by reviewing the evaluation metrics, and providing performance comparisons against prior methods.

Insta-10 Dataset: While, there are several real-world datasets, such as MSCOCO, CityScapes, etc., used for instance segmentation, they typically involve background objects, and other stuff that are unrelated to those relevant for segmentation. There have been approaches to use a simulated scene, e.g., CLEVR dataset, for instance segmentation, however, this dataset has been introduced for visual reasoning tasks, and involve objects with different colors, shapes, etc., as a result, may not fully analyze the benefits of a segmentation scheme. To this end, we intro-duce Insta-10, a large-scale dataset collected in a controlled setting, consisting of depth images of multiple instances of a CAD object model. Unlike CLEVR, we remove color and texture from the instances, to analyze the segmentation performance, under minimal attributes.

To create the dataset, we take inspirations from the recent work of Wu et al. [30] that proposes the task of simulating objects thrown into a bin (e.g., for subsequent robotic bin picking). Specifically, their setting involves a simulated bin of a given depth into which several instances of an object are thrown into. We use a PhysX physics simulator 4 and 10 CAD object models from the T-less dataset to produce multiple instance depth images.

Table 1. Mean IoU between the segmentation masks predicted by the methods against the ground truth masks.

An object model use is shown in FIG. 5A. We use 5 object instances per depth image so that there is substantial inter-instance occlusion, while we also adjust the bin width so that the segmentation objective is not too hard. Alongside the depth images, we also provide the point clouds associated with each image and the ground truth instance segmentation masks; these masks are only used for evaluation and not during training. We collected 10K images per object, amounting to 100K images in the entire dataset, and each image of dimension 224 224. Sample depth images are provided for each object in FIG. 5A.

Evaluation Metric and Experimental Setting

To evaluate our scheme, we use the mean intersection-over-union (mIoU) metric, which is a standard metric for semantic segmentation tasks. For training and evaluation, we split the data subsets associated with each class into a training, validation, and test set. We use randomly selected 100 images for validation in each class, while we carefully choose 100 images for testing. As we do not have any control on how the objects fall into the bin, there is a possibility that the instances may be well separated from each other, in which case instance segmentation may boil down to a trivial clustering of the point cloud. To avoid this situation, which can undermine the evaluation, we first run on the point clouds associated with each depth image, with 5 clusters. Next, we compute the mIoU of the found clusters against the ground truth. We selected 100 depth images from the dataset for which performed poorly. Samples from our test set are shown in FIG. 5A. As is clear, most of the test images are non-trivial for a standard clustering algorithm to segment for instances.

FIG. 5B to FIG. 5E, as noted above, provide qualitative results using InSeGAN on objects given in FIG. 5A. FIG. 5A are the input depth images. FIG. 5B are the rendering of the input depth image by multi-instance depth renderer. FIG. 5C is the predicted segmentations. FIGS. 5D and FIG. 5E show the five single instances that InSeGAN produces which when rendered and pooled results in the segmentations in FIG. 5C.

What was observed from extensive experimentation is that the novel 3D GAN solved the problem of unsupervised instance segmentation using a generative adversarial framework. By pairing the discriminator with a carefully designed generator, the model can reconstruct single object instances even under clutter and severe occlusions. The learned model when encoded can be used to achieve instance segmentation. A new large-scale dataset was used that empirically analyzed the novel approach, and the model achieved state-of-the-art results. Specifically, the new framework is creatively designed to be simple that allows for being configured for other applications and domains. For example, the novel framework of the InSeGAN results in better performance for instance segmentation when compared to documented conventional approaches, which allows the InSeGAN to perform in a variety of autonomous tasks. For example, segmenting object instances (e.g., cars) in a scene is key to automated driving, object counting is necessary for visual reasoning, and identifying instances of an organ in medical images is important for automated diagnosis.

Network Architectures

Figure 6:
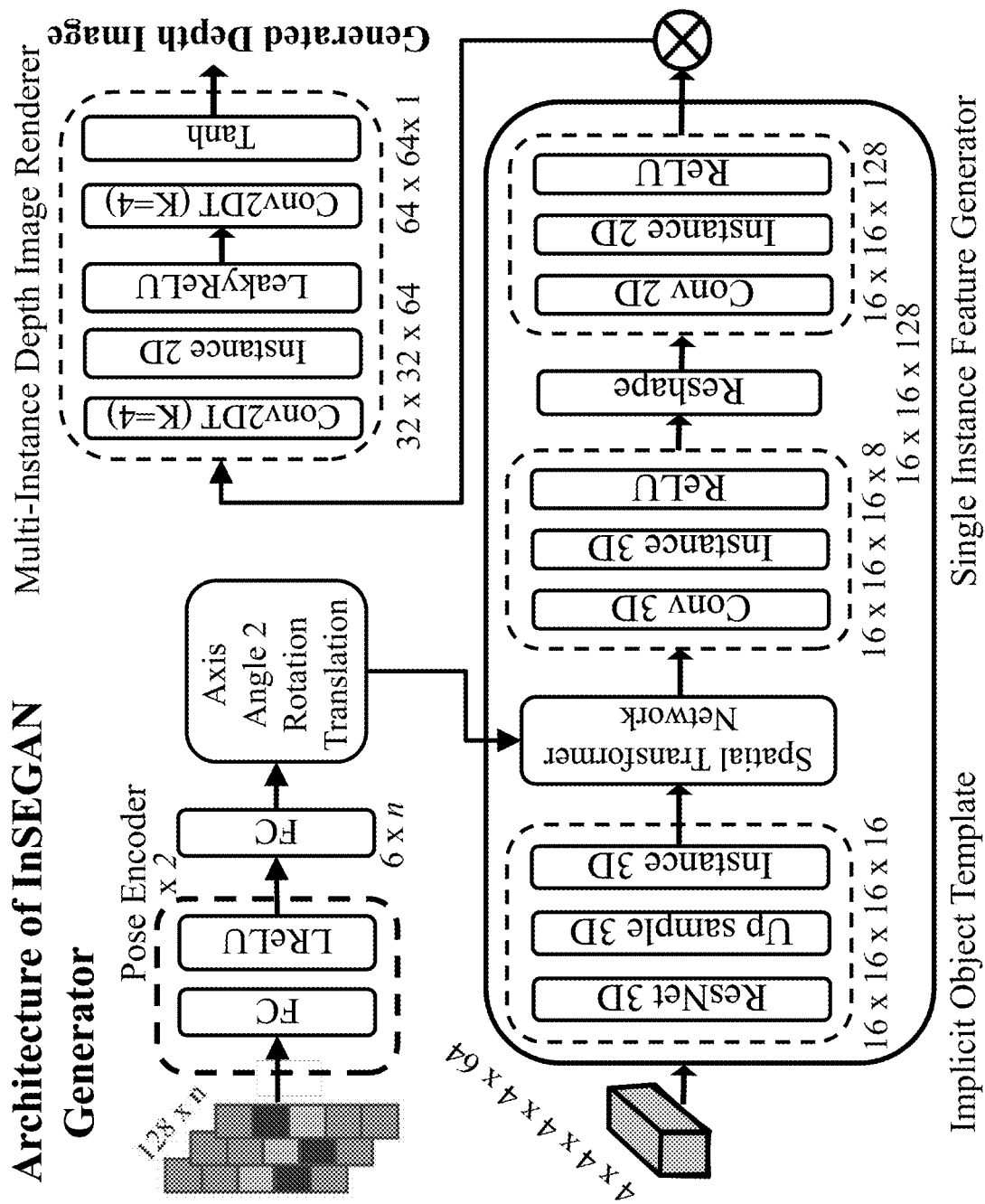
FIG. 6 shows a schematic illustrating some aspects of an architecture of the InSeGAN generator, according to some embodiments of the present disclosure.

FIG. 6 shows a schematic illustrating some aspects of an architecture of the InSeGAN generator, according to some embodiments of the present disclosure. The InSeGAN Generator has five submodules including:

(i) a pose encoder, that takes n random noise vectors $z_i \in \mathbb{R}^{128} \sim N(0, I_{128})$, where n=5 in our setup and produces 6-D vectors that are assumed to be axis-angle representations of rotations and translations (three dimensions for rotation and three for translation), which is then transformed into a rotation matrices and a translation vectors, to produce an element in the special Euclidean group (SE(3));

(ii) a 3D implicit template generation module, that takes a 4×4×4×64 dimensional tensor (representing an implicit 3D template of the object) as input, which is up-sampled in 3D using ResNet blocks and 3D instance normalization layers to produce a 16×16×16×16 feature maps;

(iii) a spatial transformer network that takes as input the 3D implicit template and the geometric transform for every instance, and transforms the template, resamples it, and produces a transformed feature map of the same size as its input, (iv) a single instance feature generator module, that reshapes the transformed template feature and produces single instance 2D feature maps (each of size 16×16×128); and (v) a depth renderer module that takes an average pool over the features for every instance and renders a multiple in-stance depth image from the pooled feature map.

The 3D implicit template do not use any stochastic modules (via MLP) that was critical in some test frameworks to produce stochastic components in the generated images (RGB in this particular case), as observed during some test experimentation. During some test experimentation we found that using noise vectors fails our setup and we lose the ability to disentangle our instances. This is perhaps because our data is synthetically generated and is devoid of any noise or textures.

Still referring to FIG. 6, an illustration of the physics simulator was used to render our synthetic dataset, Insta-10. In which, a simulated bin into which identical objects were thrown, and a ground truth instance segmentation masks for each of the instances. We use depth images associated with these instances for training InSeGAN, so that at inference these segmentation maps are recovered.

Figure 7:
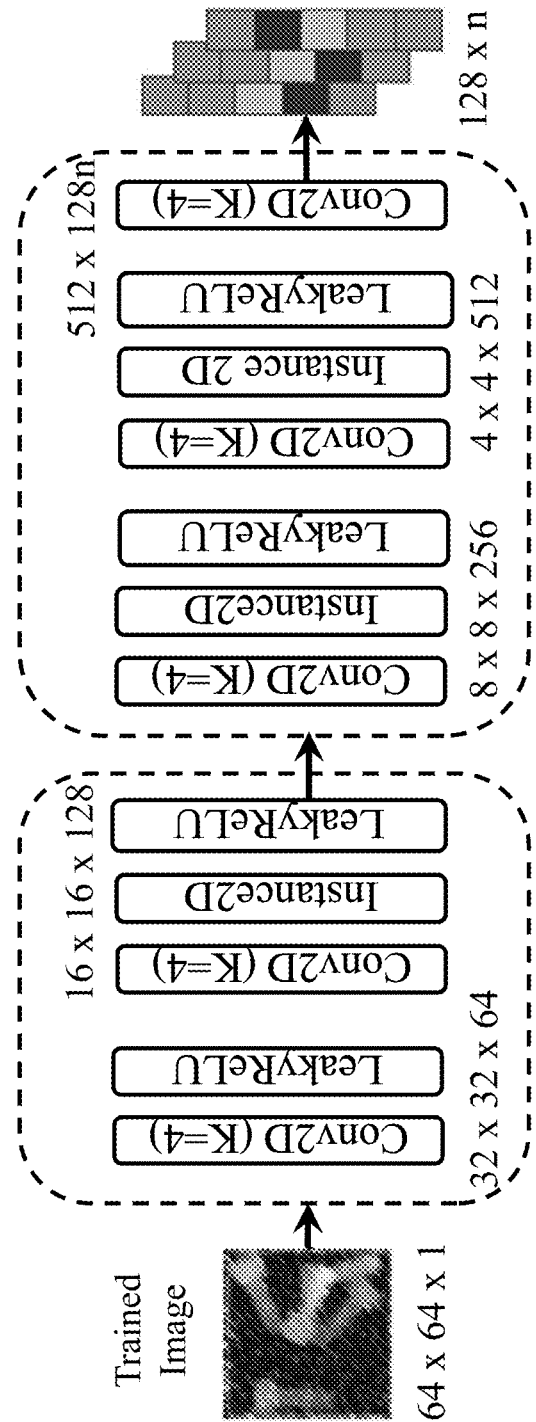
FIG. 7 shows a schematic illustrating some aspects of an architecture of the encoder module, according to some embodiments of the present disclosure.

FIG. 7 shows a schematic illustrating some aspects of an architecture of the encoder module, according to some embodiments of the present disclosure.

Figure 8:
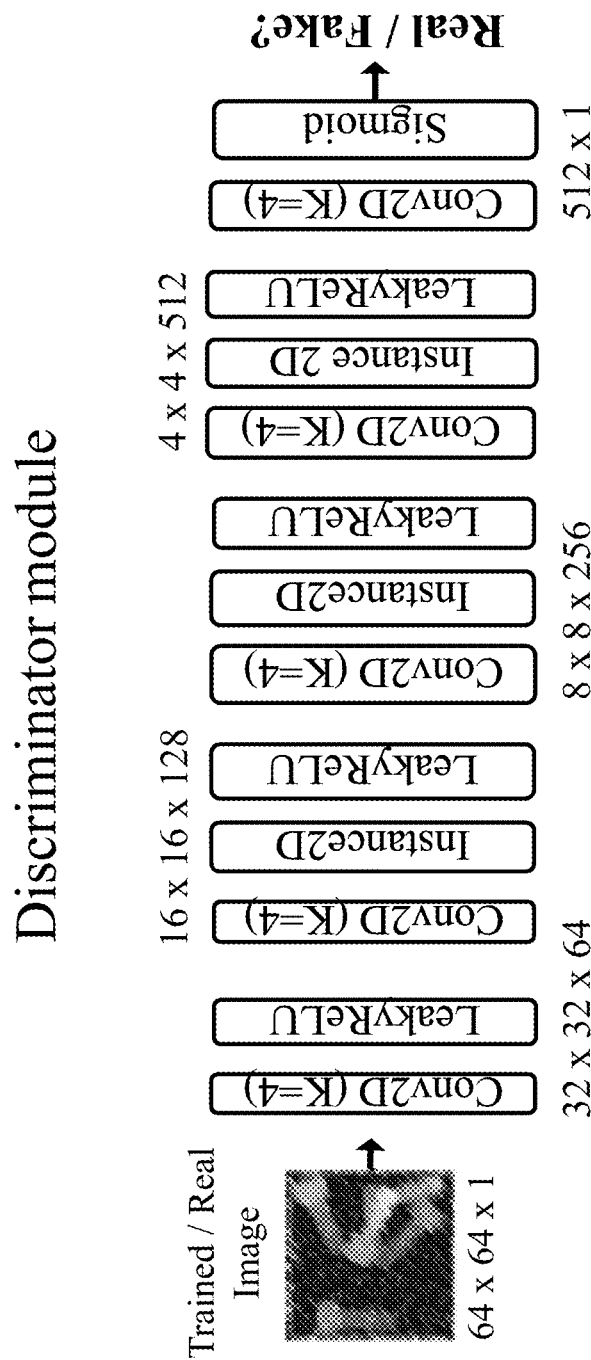
FIG. 8 shows a schematic illustrating some aspects of an architecture of the discriminator module, according to some embodiments of the present disclosure.

FIG. 8 shows a schematic illustrating some aspects of an architecture of the discriminator module, according to some embodiments of the present disclosure. For example, FIG. 7 and FIG. 8 show the neural network used in the Encoder of FIG. 7 and the Discriminator of FIG. 8, loosely follow similar architectures, except that the Discriminator takes a 64×64 depth image (either generated or from the real examples) as input and produces a scalar score, while the encoder of FIG. 7 takes a generated depth image and produces the n instance vectors as output. We use 128-D noise vectors when generating the images, and thus the Encoder of FIG. 7 is expected to produce 128-D features as output (for each instance). Both the Encoder and the Discriminator use 2D convolutions, LeakyReLU activations, and 2D instance normalization modules.

Implementation Details and Training Setup: Referring to FIG. 6, our InSeGAN modules are implemented in PyTorch. As alluded to above, we generate 224×224 depth images using our simulator, however, uses 64×64 images in our Insta-GAN pipeline. To this end, each 224×224 image is rescaled to 64×64 and normalized by mean subtraction and normalization via the variance. For training, we use horizontal and vertical image flips for data augmentations. We do not use any other augmentation scheme.

Evaluation Details: We use the mean IoU metric between the ground truth instance segments and the predicted segmentations for our evaluations. Specifically, for each ground truth segment, we find a predicted segment that is most overlapping with this segment and compute their intersection-over-union (IoU); which we then use to compute the mean IoU over all segments.

Training: Referring to FIGS. 6, FIG. 7 and FIG. 8, we train our modules for 1000 epochs using a single GPU; each epoch takes approximately 30 seconds on the ~10,000 training samples for each object. We use the Adam optimizer, with a learning rate of $2\times10^{-4}$, and $\beta1=0.5$. We use 128-D noise samples from a Normal distribution for the noise vectors, and a batch size of 128 samples.

Ablative Study: We analyze and substantiate the importance of each choice in InSeGAN. We ablate on the various losses in InSeGAN generator, the need to use the 3D GAN, instead of say, a 2D single instance generator, etc.

Is 3D Generator Important? What was realized during experimentation is that the 3D generator is an important choice that was made in InSeGAN instead of a 2D generator. During experimentation the 2D generator was a standard image-based generator typically used in conditional GANs. Specifically, for 2D generator, we replace the 3D modules in InSeGAN (i.e., the 3D implicit template, the pose encoder, and the STN) by 2D convolutions and upsampling layers, similar to those used in the encoder and the discriminator. We make two experiments to analyze and substantiate our choice: (i) to evaluate the training stability and convergence, and (ii) performance of instance segmentations on the various objects.

Figure 9A:
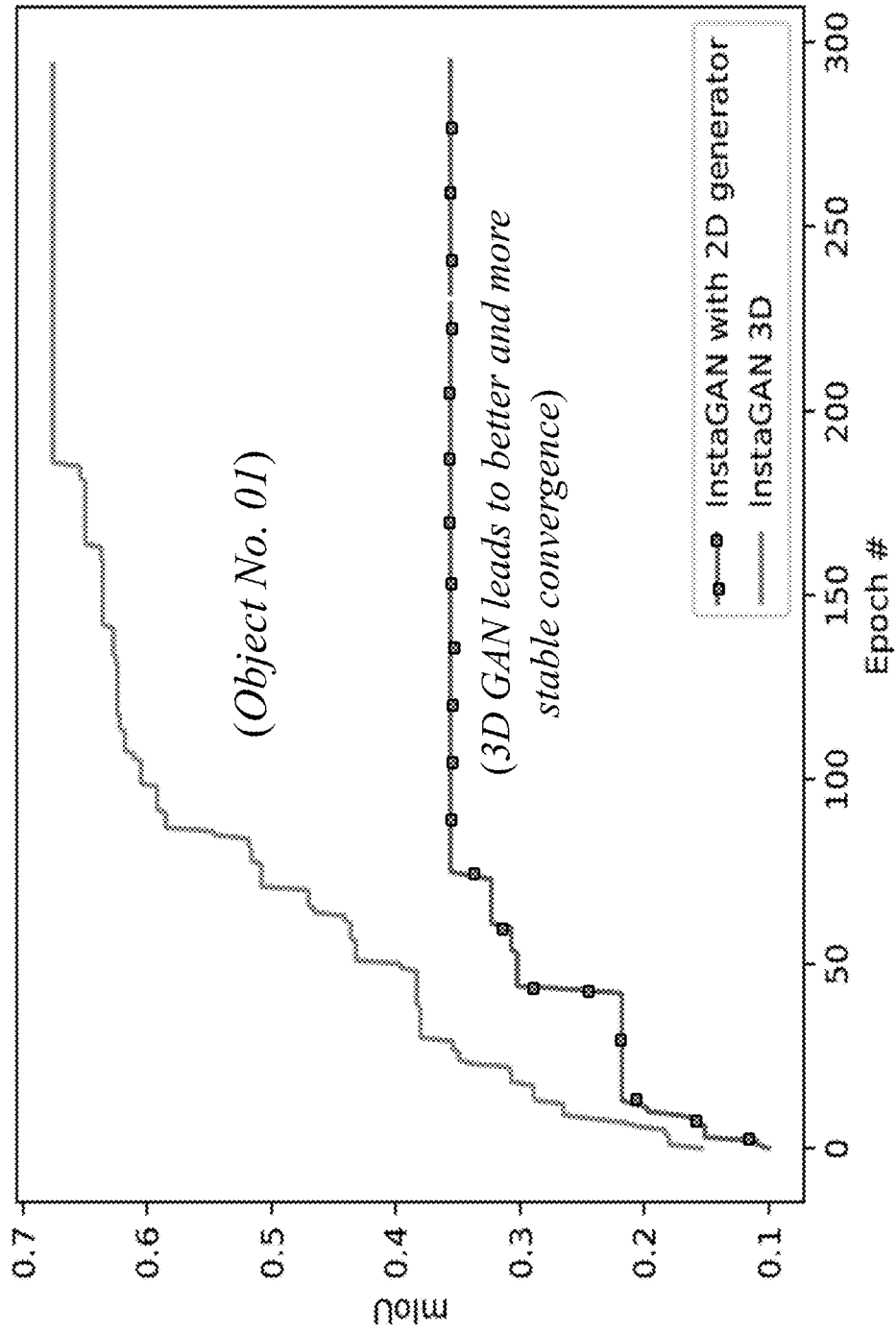
FIG. 9A, FIG. 9B and FIG. 9C show graphs illustrating the plotting of the convergence on three objects from the training depth images, namely an object (Obj01) of FIG. 9A, a cone of FIG. 9B and a connector of FIG. 9C, using the InSeGAN with 3D modules, i.e., using a pose encoder, a 3D instance template, and a Spatial Transformer Network (STN)), according to some embodiments of the present disclosure.
Figure 9B:
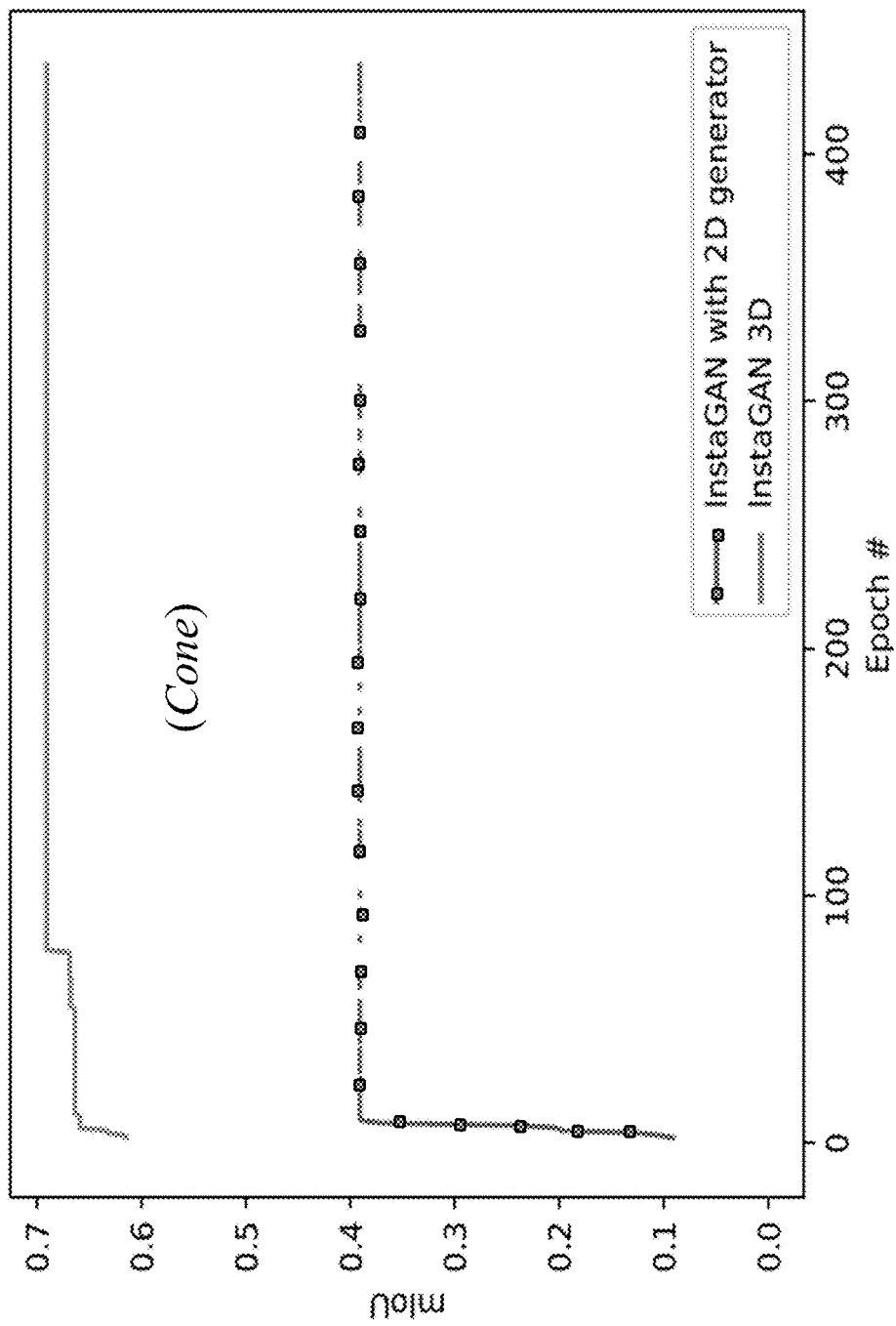
Figure 9C:
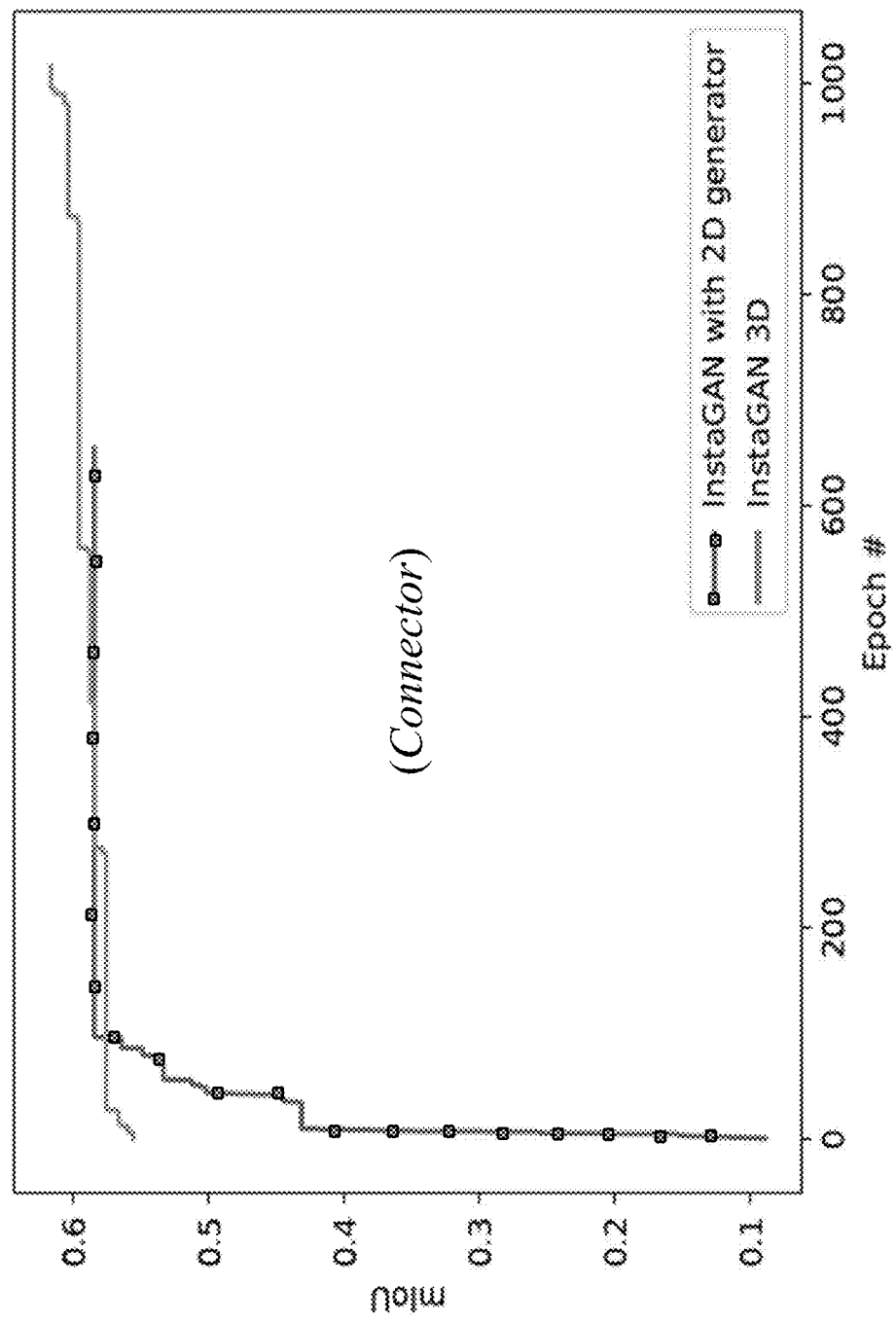

FIG. 9A, FIG. 9B and FIG. 9C show graphs illustrating the plotting of the convergence on three objects from the training depth images, namely an object (Obj01) of FIG. 9A, a cone of FIG. 9B and a connector of FIG. 9C, using the InSeGAN with 3D modules, i.e., using a pose encoder, a 3D instance template, and a Spatial Transformer Network (STN)), according to some embodiments of the present disclosure. For example, the convergence plots for three objects illustrated in FIGS. 9A to FIG. 9C, use the InSeGAN with 3D modules (i.e., using pose encoder, 3D instance template, and STN) against replacing the 3D modules by a 2D GAN (i.e., replacing the 3D modules by 2D convolutions and upsampling layers, similar to the encoder and discriminator in reverse). In the FIGS. 9A to FIG. 9C, the mIoU is plotted against epochs. As is clear, using a 3D GAN leads to better and more stable convergence. Note that in Cone (middle plot), the 2D generator is unstable and often diverges—we reset the optimizer when this happens. This is captured by the discontinuities in the blue plot. In contrast, using the 3D generator leads to very table training of the generator and discriminator and converges much faster. What was later discovered was three observations we made having reviewed the graphs that included: (i) 3D GAN is significantly faster than 2D GAN in convergence, (ii) 3D GAN is more stable, and (iii) leads to better mIoU for instance segmentation.

Are All the Losses Important? There are three different losses in InSeGAN generator: (i) the $\mathcal{L}_E^a$, computing the alignment loss, (ii) $\mathcal{L}_E^i$ on the intermediate feature maps, and (iii) $\mathcal{L}_E^p$ between the generated depth image and the regenerated depth image from the encoded latent vectors. For (i), we compare a greedy choice for alignment against using the optimal transport. We provide ablative studies on two object classes, Bolt and Obj01. As is clear from Table 1, we find that using a greedy alignment leads to lower performance. Further, we find that using E is empirically very important, and leads to 10-20% performance differences. Our analysis substantiates the importance of all the losses used in our architecture.

Figure 10A:
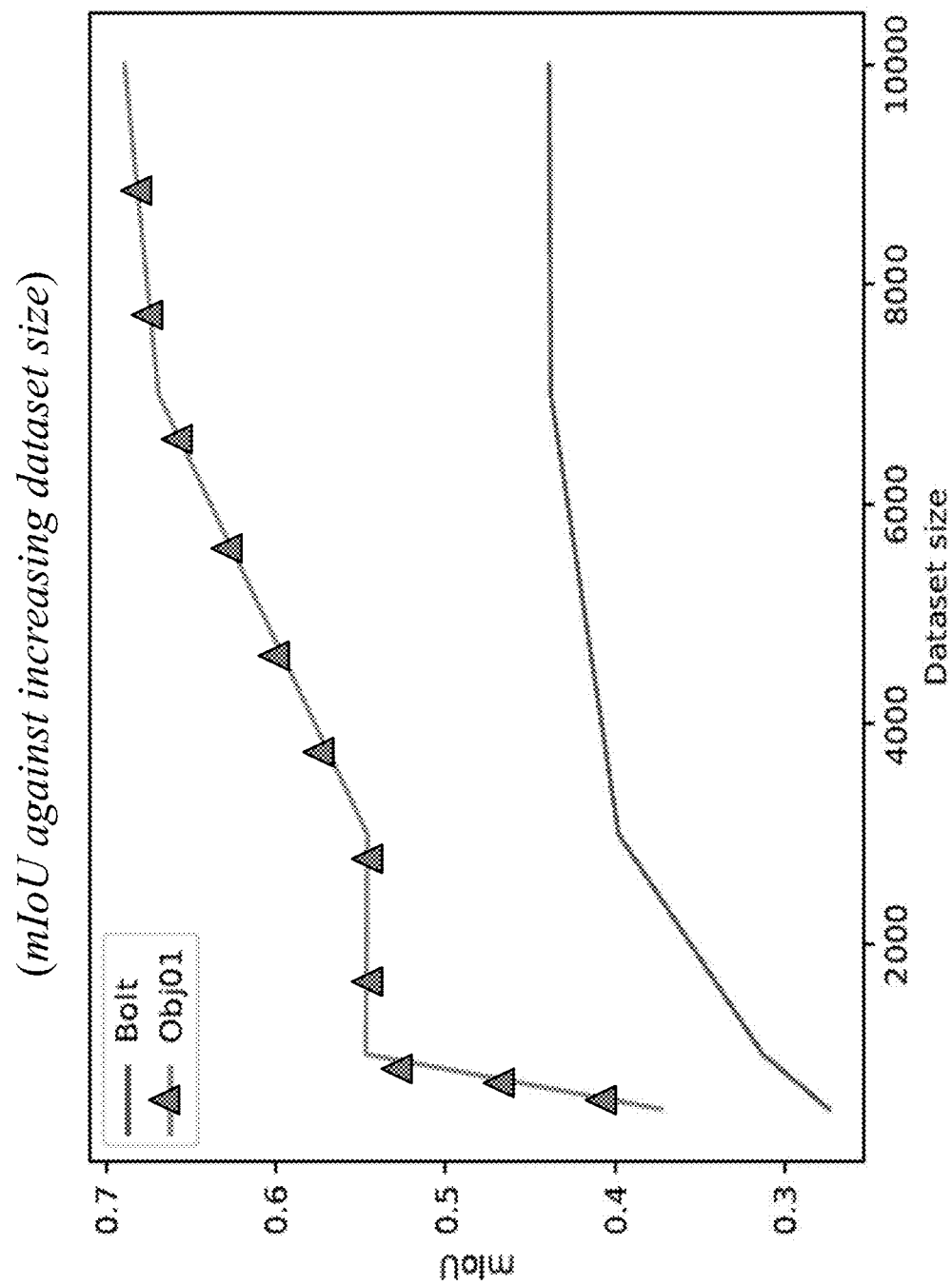
FIG. 10A is a graph of the mean intersection-over-union (mIoU) against increasing dataset size, according to some embodiments of the present disclosure.

FIG. 10A is a graph of the mean intersection-over-union (mIoU) against increasing dataset size, according to some embodiments of the present disclosure.

Figure 10B:
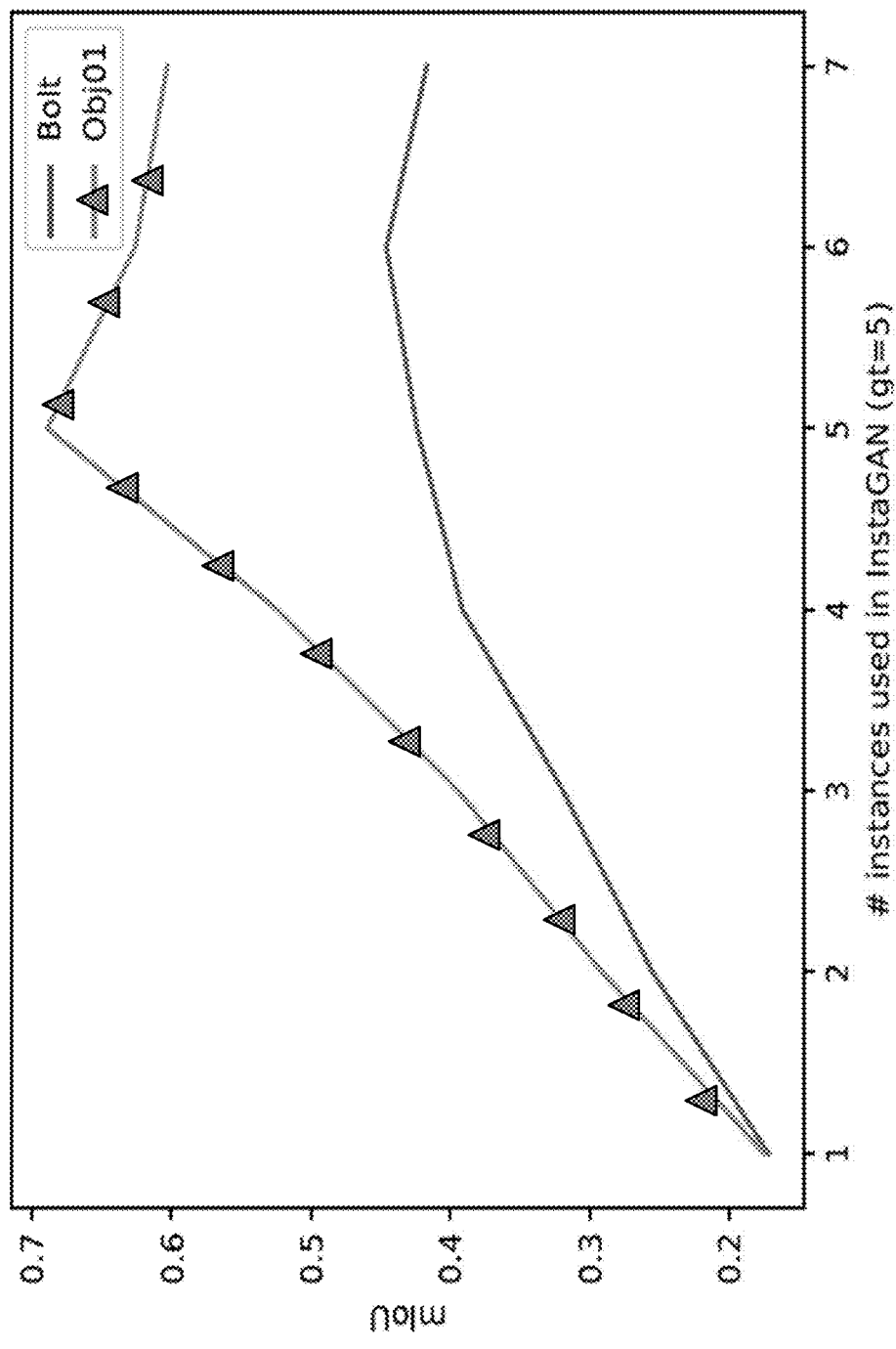
FIG. 10B is a graph of the mean intersection-over-union (mIoU) against an increasing number of instances used in InSeGAN (n), against ground truth 5 instances, according to some embodiments of the present disclosure.

FIG. 10B is a graph of the mean intersection-over-union (mIoU) against an increasing number of instances used in InSeGAN (n), against ground truth 5 instances, according to some embodiments of the present disclosure.

Do We Need All Training Samples? In FIG. 10A, we plot the performance against increasing the number of data samples. That is, we use a random subset of the 10K depth images and evaluate it on our test set. We used subsets with 500, 1000, 3000, 7000, and the full 9800 samples. In FIG. 10B, we plot this performance. As is clear more training data is useful, although this increment appears to be dependent on the object class.

FIG. 11 shows Table 1 illustrating results of a Ablative study on the various losses used in the InSeGAN generator and the mIoU achieved on two classes, according to some embodiments of the present disclosure. For example, we show qualitative results of instance segmentations obtained for different training set sizes to gain insights into what the performances reported in FIG. 10A can be interpreted as. The results show that beyond about 3000 samples, our method seems to start producing qualitatively reasonable instance segmentations, albeit with more data mIoU performance improves.

Number of Instances/Disentanglement? A key question to our framework is if we really need exact number of instances to sample the noise vectors? What happens if we only have a rough estimate? In FIG. 10B, we plot the performance against increasing the number of instances used in InSeGAN, i.e., we increase n from 1 to 7 for the number of noise vectors we sample for the generator. Recall that all our depth images consist of 5 instances.

The plot in FIG. 10B for two objects (Bolt and Obj01) shows that InSeGAN performs reasonably well when the number of instances is approximately close to the ground truth. Was observed from experimentation (named A) is a plotting of the qualitative results from these choices. Interestingly, we determined that using n=1 completely fails capturing the shapes of the objects, while n=4 learns a two-sided bolt, and n=5 seems to capture the shape perfectly. While n>5 seems to show some improvements, it is not consistent across the data classes. Overall, from this experimentation it looks like a rough estimate of the number of instances is sufficient to get reasonable performance.

Based upon the extensive experimentation, the InSeGAN produced more reasonable segmentations when compare to documented segmentation of other conventional methods.

Figure 13:
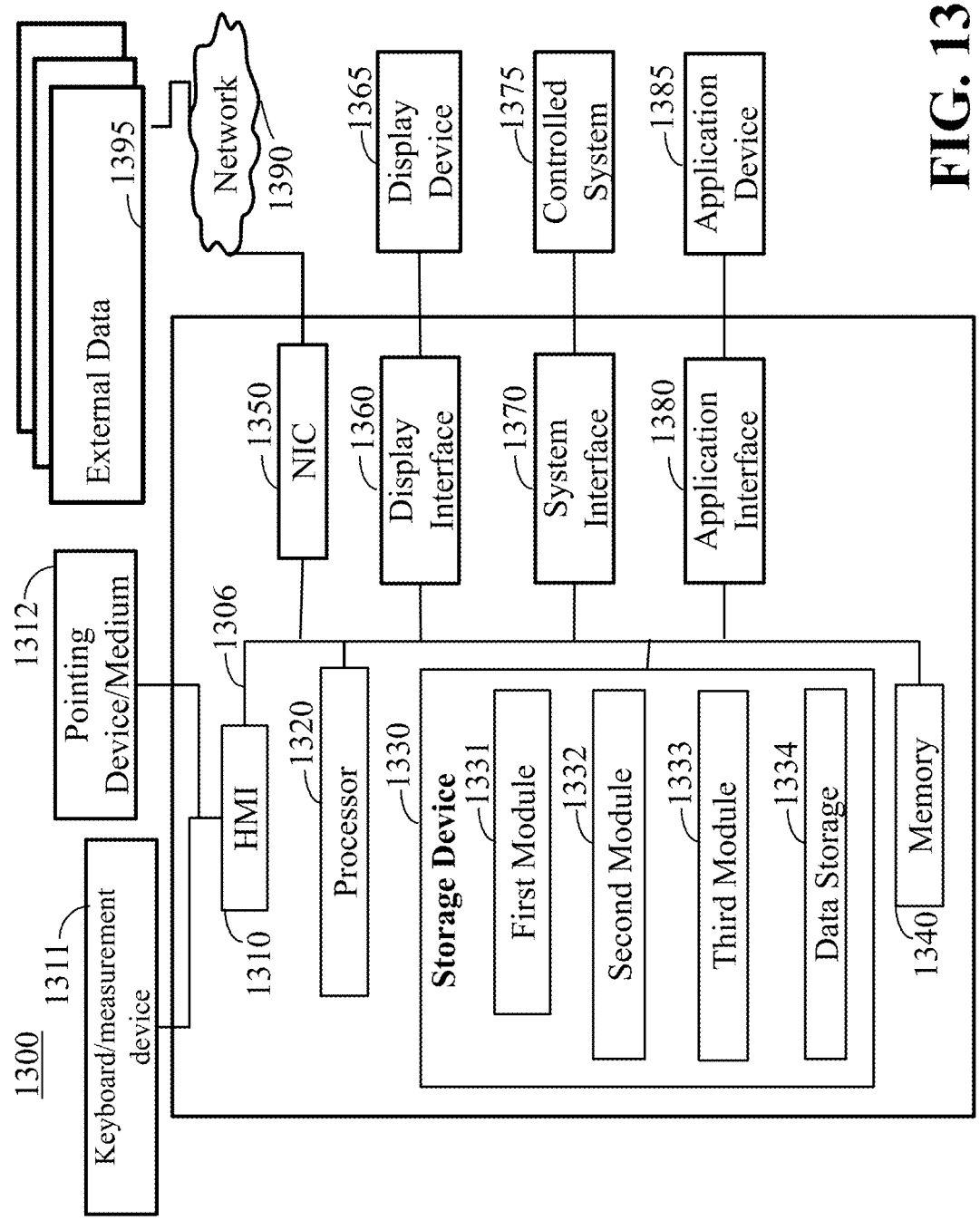
FIG. 13 shows a hardware diagram illustrating some components that may be incorporated in some systems of the present disclosure, according to some embodiments of the present disclosure.

FIG. 13 shows a hardware diagram illustrating some components that may be incorporated in some systems 1300 of the present disclosure, according to some embodiments of the present disclosure. The system 1300 can include a processor(s) 1320 configured to execute stored instructions, as well as a memory 1340 that stores instructions that are executable by the processor. The processor 1320 can be a single core processor, a multi-core processor, a computing cluster, or any number of other configurations. The memory 1340 can include random access memory (RAM), read only memory (ROM), flash memory, or any other suitable memory systems. The processor 1320 is connected through a bus 1306 to one or more input and output devices. The system 1300 can also include a storage device 1330 adapted to store a first module 1331, a second module 1332, a third module 1333 for storing executable instructions for the processor 1320. In some cases, the modules 1331, 1332 and 1333 can include the architecture of trained InSeGAN Generator shown in FIG. 6, the architecture of encoder module shown in FIG. 7, the Discriminator module shown in FIG. 8 and a trained single-instance generator, a trained generator-discriminator shown in FIG. 4. Further, the architecture of trained InSeGAN Generator may be obtained, via the network, from an external data 1395 that stores trained neural networks including InSeGAN. The storage device 1330 can store data in data storage 1334. The storage device 1330 can be implemented using a hard drive, an optical drive, a thumb drive, an array of drives, or any combinations thereof.

The system 1300 can include an input interface to receive external data 1395. The input interface can include a human machine interface 1310 within the system 1300 that connects the processor 1320 to a keyboard/measurement device 1311 and pointing device 1312, wherein the pointing device 1312 can include a mouse, trackball, touchpad, joy stick, pointing stick, stylus, or touchscreen, among others. Alternatively, the input interface can include a network interface controller 1350 adapted to connect the system 1300 through the bus 1306 to a network 1390. Through the network 1390, the external data 1395 can be downloaded and stored within the storage system 1330 as training and/or operating data 1334 for storage and/or further processing.

Still referring to FIG. 13, the system 1300 can include an output interface linked through the bus 1306, as well as a display interface 1360 adapted to connect the system 1300 to a display device 1365. Wherein the display device 1365 can include a computer monitor, camera, television, projector, or mobile device, among others. For example, the system 1300 can be connected to a system interface 1370 adapted to connect the radar imaging system to a different system 1375 controlled based on some aspect. Additionally, or alternatively, the system 1300 can be connected to an application interface 1380 through the bus 1306 adapted to connect the system 1300 to an application device 1385 that can operate based on results of image reconstruction.

Figure 14:
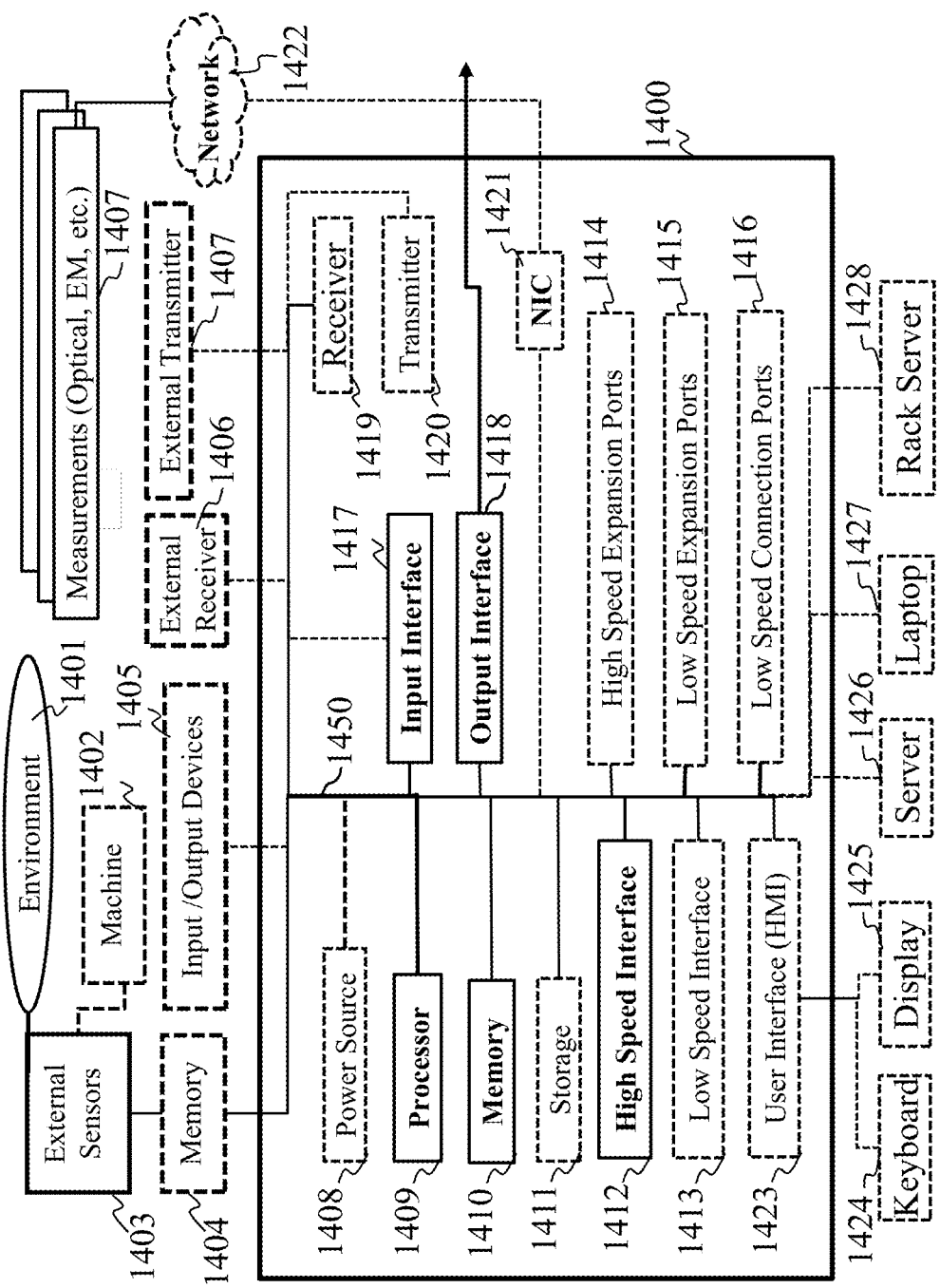
FIG. 14 is a schematic illustrating a computing apparatus that can be used to implement some techniques of the methods and systems, according to some embodiments of the present disclosure.

FIG. 14 is a schematic illustrating by non-limiting example a computing apparatus 1400 that can be used to implement some techniques of the methods and systems, according to embodiments of the present disclosure. The computing apparatus or device 1400 represents various forms of digital computers, such as laptops, desktops, workstations, personal digital assistants, servers, blade servers, mainframes, and other appropriate computers. The computing device 1400 can include a power source 1408, a processor 1409, a memory 1410, a storage device 1411, all connected to a bus 1450. In some cases, the storage device 1411 can include the architecture of trained InSeGAN Generator shown in FIG. 6, the architecture of encoder module shown in FIG. 7, the Discriminator module shown in FIG. 8 and a trained single-instance generator, a trained generator-discriminator shown in FIG. 4. Further, the architecture of trained InSeGAN Generator may be obtained, via the network, from an external data 1395 that stores trained neural networks including InSeGAN. Further, a high-speed interface 1412, a low-speed interface 1413, high-speed expansion ports 1414 and low speed connection ports 1415, can be connected to the bus 1450. Also, a low-speed expansion port 1416 is in connection with the bus 1450.

Contemplated are various component configurations that may be mounted on a common motherboard, by non-limiting example, 1430, depending upon the specific application. Further still, an input interface 1417 can be connected via bus 1450 to an external receiver 1406 and an output interface 1418. A receiver 1419 can be connected to an external transmitter 1407 and a transmitter 1420 via the bus 1450. Also connected to the bus 1450 can be an external memory 1404, external sensors 1403, machine(s) 1402 and an environment 1401. Further, one or more external input/output devices 1405 can be connected to the bus 1450. A network interface controller (NIC) 1421 can be adapted to connect through the bus 1450 to a network 1422, wherein data or other data, among other things, can be rendered on a third-party display device, third-party imaging device, and/or third-party printing device outside of the computer device 1400.

Still referring to FIG. 14, also contemplated is that the memory 1410 can store instructions that are executable by the computer device 1400, historical data, and any data that can be utilized by the methods and systems of the present disclosure. The memory 1410 can include random access memory (RAM), read only memory (ROM), flash memory, or any other suitable memory systems. The memory 1410 can be a volatile memory unit or units, and/or a non-volatile memory unit or units. The memory 1410 may also be another form of computer-readable medium, such as a magnetic or optical disk.

Still referring to FIG. 14, a storage device 1411 can be adapted to store supplementary data and/or software modules used by the computer device 1400. For example, the storage device 1411 can store historical data and other related data as mentioned above regarding the present disclosure. Additionally, or alternatively, the storage device 1411 can store historical data similar to data as mentioned above regarding the present disclosure. The storage device 1411 can include a hard drive, an optical drive, a thumbdrive, an array of drives, or any combinations thereof. Further, the storage device 1411 can contain a computer-readable medium, such as a floppy disk device, a hard disk device, an optical disk device, or a tape device, a flash memory or other similar solid-state memory device, or an array of devices, including devices in a storage area network or other configurations. Instructions can be stored in an information carrier. The instructions, when executed by one or more processing devices (for example, processor 1409), perform one or more methods, such as those described above. The system can be linked through the bus 1450 optionally to a display interface or user Interface (HMI) 1423 adapted to connect the system to a display device 1425 and keyboard 1424, wherein the display device 1425 can include a computer monitor, camera, television, projector, or mobile device, among others.

Still referring to FIG. 14, the computer device 1400 can include a user input interface 1417 adapted to a printer interface (not shown) can also be connected through bus 1450 and adapted to connect to a printing device (not shown), wherein the printing device can include a liquid inkjet printer, solid ink printer, large-scale commercial printer, thermal printer, UV printer, or dye-sublimation printer, among others. The high-speed interface 1412 manages bandwidth-intensive operations for the computing device 1400, while the low-speed interface 1413 manages lower bandwidth-intensive operations. Such allocation of functions is an example only. In some implementations, the high-speed interface 1412 can be coupled to the memory 1410, a user interface (HMI) 1423, and to a keyboard 1424 and display 1425 (e.g., through a graphics processor or accelerator), and to the high-speed expansion ports 1414, which may accept various expansion cards (not shown) via bus 1450. In the implementation, the low-speed interface 1413 is coupled to the storage device 1411 and the low-speed expansion port 1415, via bus 1450. The low-speed expansion port 1415, which may include various communication ports (e.g., USB, Bluetooth, Ethernet, wireless Ethernet) may be coupled to one or more input/output devices 1405, and other devices a keyboard 1424, a pointing device (not shown), a scanner (not shown), or a networking device such as a switch or router, e.g., through a network adapter.

Still referring to FIG. 14, the computing device 1400 may be implemented in a number of different forms, as shown in the figure. For example, it may be implemented as a standard server 1426, or multiple times in a group of such servers. In addition, it may be implemented in a personal computer such as a laptop computer 1427. It may also be implemented as part of a rack server system 1428. Alternatively, components from the computing device 1400 may be combined with other components such as the embodiment of FIG. 13. Each of such devices may contain one or more of the computing device 1300 and the device 1400, and an entire system may be made up of multiple computing devices communicating with each other.

Features

According to the system embodiments recited in the claims, i.e. claims 1, 13 and 14, the following aspects are contemplated to each include an another embodiment when combined with each of the above independent claims, or one or a combination of the aspects are intended to include an embodiment with of the above independent claims.

For example, an embodiment can include the system independent claim 1, or claim 13 or claim 14, based upon one or a combination of aspects recited below. For example, an aspect can include the real depth image is obtained from at least one sensor including one of, (a) a time-of-flight depth camera, (b) a structured light depth camera, (c) a stereo depth camera that is one of at least two infrared cameras, an infrared projector or a color camera. Wherein the at least one sensor is positioned to sense objects in one or more bins. Another aspect maybe the objects are components of a manufacturing kit or objects to be shipped, and the objects are identified by an identifier, upon the objects being identified, the processor accesses stored instructions that, when executed by the processor, cause the processor to: (a) retrieve a list of expected components of the manufacturing kit or objects to be shipped assigned to a first customer based upon the identifier; (b) compare the list to a customer database to verify the list of expected components are to be delivered within a time period to the first customer; and (c) upon confirming the delivery time period, identify differences between the list of expected components to the first customer database of the objects. Yet, still another aspect can be further comprising: a check-in system configured to associate an identity of a customer with one or more bins containing objects, such that the check-in system includes one or a combination of, a radio frequency identification (RFID) transceiver, a WiFi transceiver, a reading device, a wireless transceiver device or some other transceiver device or an other reading device.

An aspect may be that the trained GAN is configured to learn to segment identical instances of objects randomly placed in a bin in an unsupervised approach. Another aspect can be the generator is a single instance generator that learns distribution of appearances of a rigid object from a cluttered or complicated scene including multiple identical instances. Yet another aspect may be the pose encoder takes as input the estimated depth image and produces as an output latent noise vectors. Another aspect can be the estimated depth image includes a noise vector that is inputted into the pose encoder, and as an output produces an axis-angle representation of a 6D pose of an instance. It is possible that an aspect is the discriminator is configured to learn to count whether a number of rendered instances matches a number of instances in the real depth image, and whether a layout of the estimated depth image is similar to compositions of the instances in the real depth image. Such that an aspect can be the generator and the discriminator are trained in a min-max adversarial game so that the generator learns to generate images that can fool the discriminator, while the discriminator is in turn trained to distinguish whether the input data into the discriminator are real or fake, such that optimization occurs when the discriminator is unable to recognize whether the input data in the discriminator is from the generator or the real depth image. Another aspect is the training of the GAN is configured to implicitly force the generator to capture a distribution of single object instances, and that the when using the trained GAN for instance segmentation, the pose encoder takes as input the estimated depth image, and is trained to reproduce instance noise vectors, such that each instance noise vector is individually decoded by the generator to form a single object instance. Finally another aspect is the generator and the discriminator are trained in a min-max adversarial game so that the generator learns to generate images that can fool the discriminator, while the discriminator is in turn trained to distinguish whether the input data into the discriminator is real or fake, such that optimization occurs when the discriminator is unable to recognize whether the input data in the discriminator is from the generator or the real depth image.

An aspect includes the trained discriminator is configured to learn to (a) count whether a number of rendered instances matching a number of instances in the data distribution of the real image; (b) provide that rendered instances in the estimated depth image look identical under diverse viewpoints to the instances in the data distribution of real images; and (c) whether a layout of the estimated depth image is similar to compositions of the instances in the real depth image. Another aspect is that the estimated depth images are inputted into the trained GAN and segmented into its instances by encoding the instances using an instance encoder to produce latent vectors. Each latent vector is then independently translated to a single instance depth image, following which the single instance depth images are thresholded on depth to find pixels associated with the instances, which are merged to form the single instance segments, these single instance segments are merged to produce the instance segmentation for the real depth image input. An aspect is that the generator uses noise vectors from the training depth images to generate the estimated depth image, and the encoder is configured to input the estimated depth image and as an output reconstruct each noise vector in the noise vectors at training time.

Another aspect further comprising: each noise vector output of the encoder is matched with the noise vectors used by the generator, such that the matching uses an optimal transport loss; wherein the output noise vector of the encoder is used to produce intermediate features that match with the intermediate features produced using the noise vectors by the generator, such that the matching uses a Euclidean loss; wherein the noise vectors of the encoder are re-used in the generator to produce a new estimated depth image, which are configured to match with a previously generated estimated depth image, such that the matching uses an L1 loss; and wherein the Encoder is trained via backpropagating over a loss computed by adding the optimal transport loss, the Euclidean loss, and the L1 loss.

An aspect is that the trained GAN is configured to learn to segment identical instances of objects randomly placed in a bin in an unsupervised approach. Another aspect is the generator is a single instance generator that learns distribution of appearances of a rigid object from a cluttered or complicated scene including multiple identical instances. Yet another aspect is the pose encoder takes as input the estimated depth image and produces as an output latent noise vectors. Still another aspect is the estimated depth image includes a noise vector that is inputted into the pose encoder, and as an output produces an axis-angle representation of a 6D pose of an instance. Also, another aspect is the discriminator is configured to learn to count whether a number of rendered instances matches a number of instances in the real depth image, and whether a layout of the estimated depth image is similar to compositions of the instances in the real depth image.

Figure 15A:
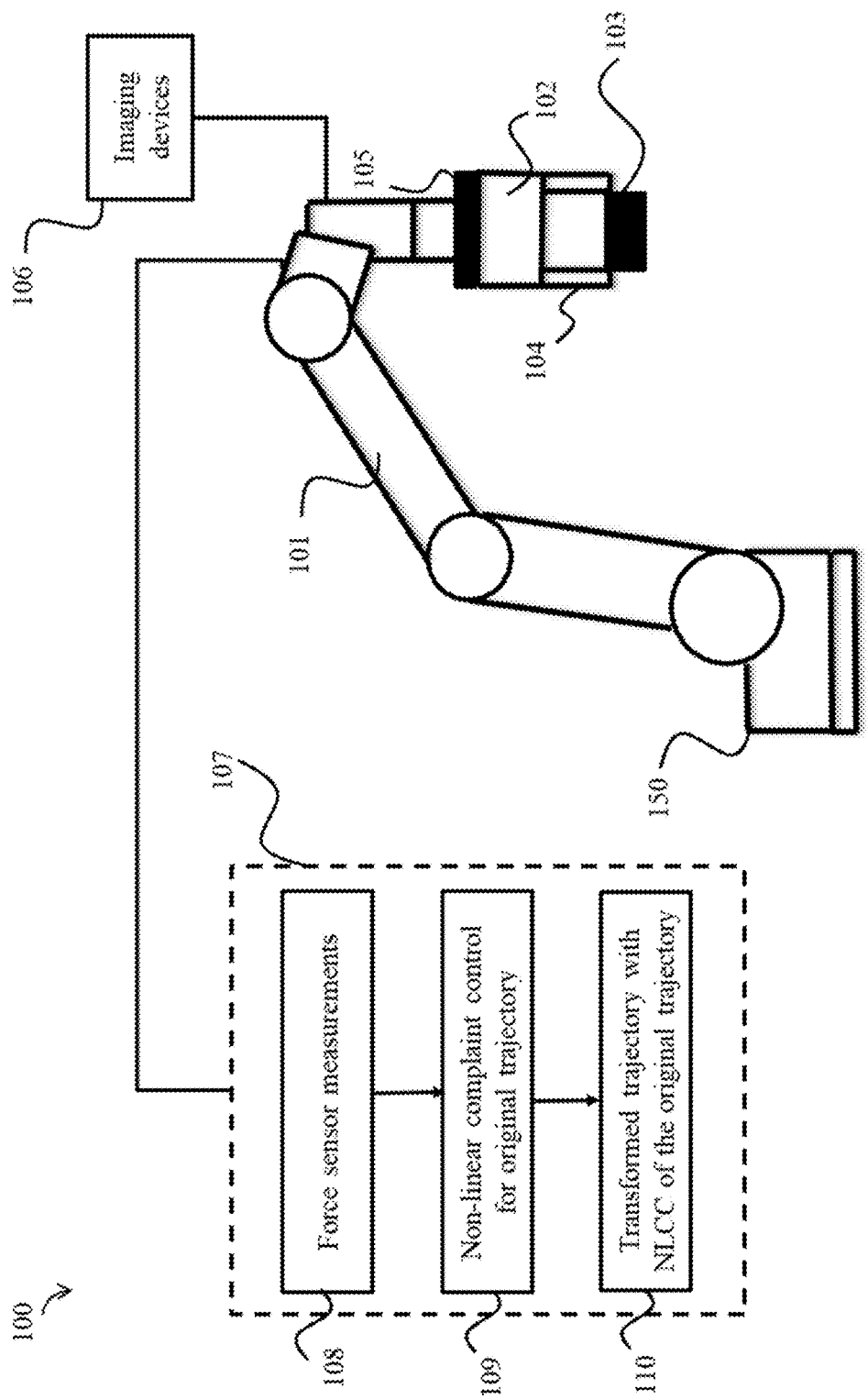
FIG. 15A shows a robotic configuration 100 of a robot 150, according to some embodiments of the present disclosure.
Figure 15B:
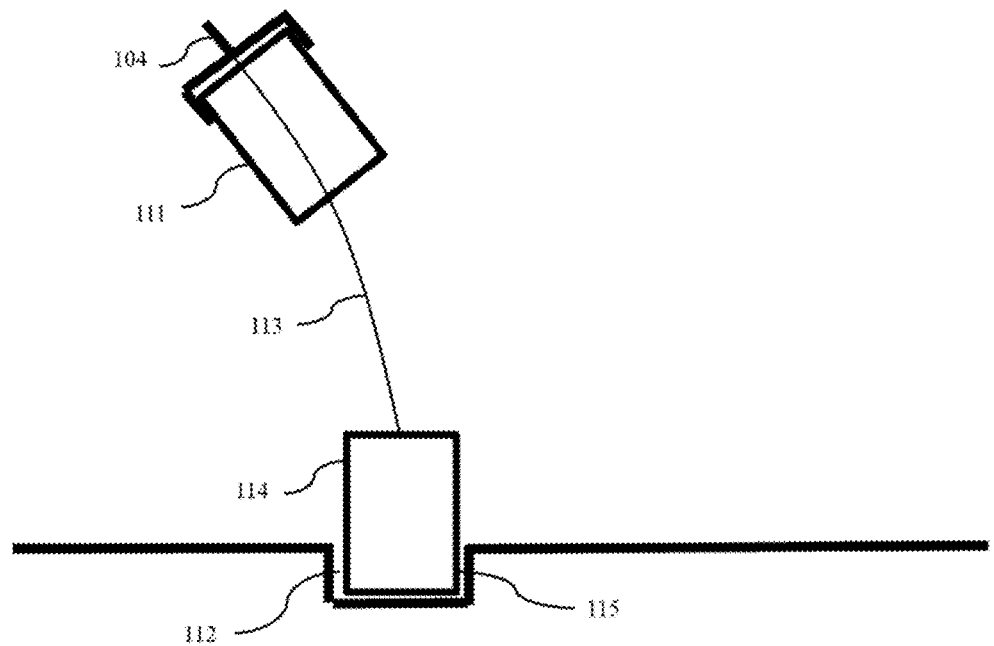
FIG. 15B shows an exemplary assembly operation, according to an embodiment.

FIG. 15A shows a robotic configuration 100 of a robot 150, according to some embodiments. The robot 150 includes a robotic arm 101 for performing an assembly operation. The robotic arm 101 includes a wrist 102 for ensuring multiple degrees of freedom of moving an object. In some implementations, the wrist 102 is provided with an end-tool 104 for holding an object 103 and/or for performing any other robotic operation, such as an assembly operation. The end-tool 104, for example, may be a gripper. Hereinafter, the 'end-tool' and 'gripper' may be used interchangeably. According to an embodiment, an objective of the assembly operation is to place two parts together, typically in close contact. For example, insertion of an object, along a trajectory, into another object to assemble a product. FIG. 15B shows exemplary assembly operation, according to an embodiment. FIG. 15B is explained in conjunction with the robot 150 as shown in FIG. 15A.

The robot 150 is configured to perform the assembly operation, e.g., insert the object 103 into another object, along the trajectory. As used herein, the trajectory corresponds to a path defining a motion of the object 103 held by the gripper 104, for performing the assembly operation. In a simple scenario, the trajectory can dictate only a vertical motion of the wrist 102. However, as the wrist 102 includes multiple degrees of freedom, the trajectory may comprise a motion profile spanning in multi-dimensional space.

A pose of an object refers to a combination of a position and an orientation of the object. The gripper 104 is holding initially the object 103 (e.g., a peg) which is movable, in a start pose 111. A pose of the gripper 104 corresponding to the start pose 111 is referred to as a start pose of the gripper 104. According to an embodiment, aim of the insertion operation is to insert the movable object 103 into an immovable object 112 of pose 115, wherein the object 112 includes a hole to receive the object 103. The pose 115 of the object 112 may refer to a position and/or orientation of the object 112. The robot 150 is configured to move the gripper 104 along a trajectory 113 to insert and place the object 103 in a pose 114 in the hole of the object 112. The pose 114 of the object 103 in the hole of the object 112 is referred to as a goal pose. A pose of the gripper 104 corresponding to the goal pose is referred to as a goal pose of the gripper 104.

The goal pose of the gripper 104 is determined based on a position of the object 112. At the end of a successful execution of the insertion operation, the pose of the gripper 104 of the robot arm 101 is considered to have attained the goal pose of the gripper 104. Therefore, achieving the goal pose of the gripper 104 is equivalent to the successful execution of the insertion operation. According to an embodiment, the trajectory 113 is defined according to the start pose and goal pose of the gripper 104, and the pose 115 of the object 112. Further, such assembly operation may be executed repeatedly by the robot 150.

Some embodiments are based on a recognition that the pose of the object 103 and the pose of the object 112 involved in the assembly operation may vary between the repetitions of the assembly operation, due to which one or combination of the object 103 and the object 112 are located in a different pose. For example, in case the object 112 arrives on a moving conveyor belt, it may not be possible, each time, the object 112 arrives at the moving conveyor belt in a particular pose (e.g. pose 115). Consequently, the object 112 may end up in a different pose. To that end, a change in the pose (the orientation and the position) of the object 112 involved in the assembly operation leads to at least one or combination of a new start pose and a new goal pose, which is referred to as an end-pose modification. As the trajectory is defined according to the start pose and goal pose of the gripper 104 and the pose 115 of the object 112, the trajectory 113 cannot be utilized for different assembly operations involving poses other than the aforementioned poses. In such a case, various measurement devices are used to determine pose of the objects 103 and 112. According to some embodiments, the measurement devices determine the new start pose and the new goal pose of the gripper 104. The measurement devices include imaging devices 106, such as industrial vision cameras. In some implementations, a single imaging device may be used. In some cases, one or more measurement devices 106 (1311 in FIG. 13, 1403 in FIG. 14) may be arranged on a fixed platform (e.g. wall, desk, frame, or fixed structure) being separated from the robot arm/robot, or on the robot arm/robot, or on another moving platform (or moving carrier car) to realize a system for generating verisimilar images from real depth images.

However, accuracy of the pose of the object 103 and the pose of the object 112 determined by such cameras may be less accurate for the assembly operation. For example, errors in the pose determination by the industrial vision cameras are in the order of 1-2 mm, unless expensive imaging device is used. Such error is at least an order of magnitude larger than tolerances needed in precision insertion operations (which can be in the order of 0.1 mm). Therefore, due to the significant inaccuracy of the determined pose of the objects 103 and 112, the object (e.g. 103) to be inserted may collide with parts of another object (e.g. 112) involved in the assembly operation.

Figure 15C:
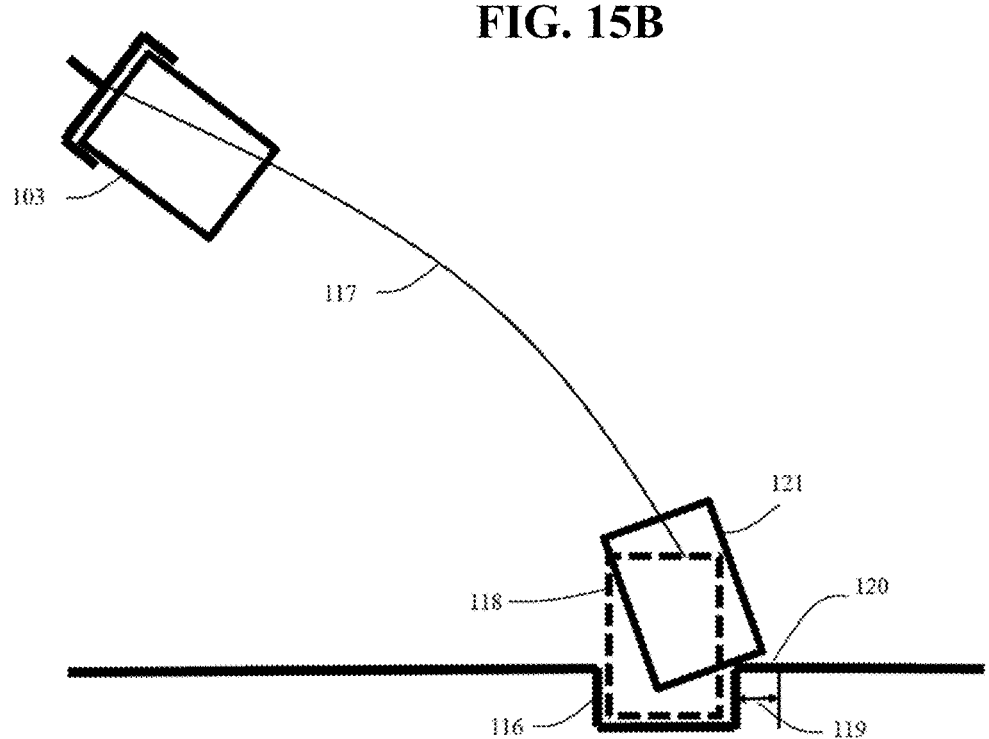
FIG. 15C shows a result of the assembly operation due to inaccurate determination of pose of an object by imaging devices, according to some embodiments of the present disclosure.

FIG. 15C shows a result of the assembly operation due to inaccurate determination of pose of the object 103 by the imaging devices, according to some embodiments. FIG. 15C is explained in conjunction with the robot 150 shown in FIG. 15A and FIG. 15B. For example, the pose 115 of the object 112 (shown in FIG. 15B) may change and the imaging devices 106 may determine that the pose 115 is changed to pose 116. In particular, the imaging devices 106 may determine that the object 112 is at position 116. As the position 115 of the object 112 is changed to the position 116, the goal pose 114 (shown in FIG. 15B) may change to a goal pose 118. The trajectory 113 is transformed into a trajectory 117 according to the pose 116 and the goal pose 118. However, if true position of the object 112 is determined inaccurately, and is away from the determined position 116 by a specific distance 119, the trajectory 117 trajectory does not result into a correct insertion and the collision may occur between the object 103 and the part of the object 112, for example, an edge 120. As a result, a displacement of the object 103 occurs and the object 103 may remain in incorrect pose 121. Further, due to such collision the gripper 104 of the robotic arm 101 may experience force specific to the pose 121.

To that end, some embodiments are based on the recognition that the poses determined by the imaging devices 106 alone are not sufficient to perform the assembly operation successfully. To overcome this limitation of the imaging devices 106, adaptive assembly strategy (AAS) 107 is used. The AAS 107 is based on the recognition that force experienced in the assembly operation can be used to correct the inaccuracy of the pose determination by the imaging devices 106. To that end, the robot 150 is equipped with a force sensor. For example, a force sensor 105 is operatively connected to the wrist 102 or the end-tool of the robotic arm 101. The force sensor 105 is configured to produce measurements force and/or torque experienced 108 (also referred as force sensor measurements 108) by the end-tool (the gripper 104) of the robot 150 during the assembly operation. In some implementations, the robot 150 is equipped with a torque sensor for measuring torque experienced by the end-tool 104. Some embodiments are based on recognition that the force sensor measurements 108 can be used to correct the trajectory 117 such that the goal pose 118 is achieved.

To that end, a non-linear mapping is determined 109 for the trajectory 113. The non-linear mapping maps the force sensor measurements 108 onto corrections to the trajectory 117 in a non-linear manner. In other words, the non-linear mapping provides corrections for the trajectory 117 of the robot 150 during the assembly operation along the trajectory 117. The corrections may include displacement to the object 103 that allows achieving the new goal pose of the robot (robot arm). To that end, the non-linear mapping provides mapping between the forces and the displacements. In an alternate embodiment, the corrections may correspond to pose and/or velocity corrections. The trajectory 113 is referred to as an 'original trajectory'. As explained below, the original trajectory is the trajectory for which the non-linear mapping is determined.

Some embodiments are based on understanding that a non-linear mapping can be determined for a specific assembly operation along a specific trajectory (e.g. trajectory 113) and repeated any number of times for the same assembly operation by robots that are same as robot 150. However, when the start and/or the goal pose involved in the assembly operation change, the original trajectory 113 is transformed accordingly to produce a transformed trajectory. Subsequently, the non-linear mapping determined for the original trajectory 113 may need to be modified according to a transformed trajectory (e.g. trajectory 117).

However, some embodiments are based on realization that if the original trajectory 113 is transformed according to changes in the start and/or goal pose, the non-linear mapping determined for the original trajectory 113 is valid for the transformed trajectory without any additional adaptation 110. For example, such a realization is true because sign and magnitude of the forces depends entirely on a relative position of the two objects (e.g. the object 103 and the object 112), and not on their absolute position in space. Therefore, if one of the object 103 and the object 112 is moved to a different position and the other object approaches it along a similarly transformed trajectory, the same forces may arise.

Accordingly, such realization allows some embodiments to determine offline, i.e. in advance, an original trajectory (e.g. trajectory 113) and a non-linear mapping for the original trajectory, and transform online, i.e. during the assembly operation, the original trajectory to accommodate changes in the start and/or goal pose and to control the robot 150 according to the transformed trajectory and the non-linear mapping determined for the original trajectory. In such a manner, various embodiments can accommodate changes in the start and/or goal poses measured with the imaging devices 106, such as cameras, having precisions less than the precision of the assembly operation. As a result, it allows using economical cameras in the assembly operation. Further, it minimizes task-specific robot programming as the non-linear mapping determined for the original trajectory can be retained for the transformed trajectory.

The non-linear mapping can be determined via training. For example, a supervised machine learning algorithm can be used to learn the mapping between the forces and the displacements due to the forces. Such mapping is learned offline. The mapping from the displacements to the forces is typically many-to-one, i.e. multiple displacements may sometimes result in a same force. During online, i.e. in real-time assembly operation, an inverse mapping of such mapping can be used for the correction in the assembly operation. However, the inverse mapping may be one-to-many, i.e. a force measured may be mapped to multiple displacements, which is not a function that can be learned by means of machine learning. Such an ambiguity of the mapping challenges a possibility of learning the non-linear mapping. Some embodiments are based on a realization that adaptive complaint control learning can be used in the AAS to eliminate the ambiguity in the mapping of the non-linear complaint controller.

In some cases, a robot may include a robotic arm including an end-tool having a motion with multiple degrees of freedom, wherein, during an operation of the robot, a force sensor is arranged to produce measurements indicative of force experienced by the end-tool of the robotic arm during the operation; a plurality of motors configured to change a motion of the robotic arm according to a command produced according to a control law; at least one processor; and memory having instructions stored thereon that, when executed by the at least one processor, cause the processor, upon receiving data indicative of an original trajectory for the motion of the robotic arm transitioning a pose of the end-tool from a start pose to a goal pose to perform an assembly operation, to: determine the control law for controlling the plurality of motors to move the robotic arm according to the original trajectory; execute a self-exploration program that explores a space of the original trajectory by controlling the plurality of motors according to the control law while introducing different displacements from the original trajectory into a state of the robotic arm and registering, upon detecting the force experienced by the end-tool of the robotic arm, a pair of a measurement of a force sensor and a corresponding value of a displacement from the original trajectory to produce training data indicative of the space of the original trajectory; learn, using the training data, a non-linear compliant control law including a non-linear mapping that maps the measurements of the force sensor to a direction of corrections to the original trajectory defining the control law; wherein the instructions executed by the at least one processor, further cause the processor, upon receiving an end-pose modification of the original trajectory including at least one or combination of a new start pose of the end-tool of the robotic arm and a new goal pose of the end-tool measured with an accuracy less than an accuracy of the assembly operation, to: transform the original trajectory according to the end-pose modification to produce a transformed trajectory; update the control law according to the transformed trajectory to produce an updated control law; and command the plurality of motors to control the robotic arm according to the updated control law corrected with the non-linear compliant control law learned for the original trajectory.

Although the robotic system described above expresses, as an example, a robot that can manipulate/assemble parts of a product, the robot system can be applied to a robot that can be applied to a case where lot of foods in food processing plants are irregularly shaped objects (cut vegetables, fried chickens, etc.). The robotic system that includes a system for generating verisimilar images from real depth images and automatically segmenting multiple instances of a rigid object in depth images can be applied to the automation of food processing plants, industrial robots which can manipulate foods. Further, the robotic system described above can be applied to a segmentation (method) system for food recognition. Segmentation is one of the most popular and important problems in the image processing. It's essential to make accuracy of segmentation high and both training and computation time short for applying to food processing plants.

The above description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

What is claimed:

1. A system for generating verisimilar images from real depth images, comprising:
   a processor connected to a transceiver and data storage, and computer readable instructions including a trained generative adversarial neural network (GAN) having a trained generator, a trained discriminator and a trained pose encoder that, when executed by the processor, cause the processor to
   receive a real depth image with instances of an object, via the transceiver;
   input, simultaneously, each estimated depth image into the discriminator and the pose encoder, the discriminator discriminates each estimated depth image against the real depth image to obtain a discriminator loss, and the pose encoder generates a set of pose transformation matrices that are matched to a set of sampled transformation matrices to obtain a matching loss;
   iteratively repeating the process on the estimated depth images, until the discriminator loss and the matching loss are minimized to a threshold, to end the training period;
   identify the instances in the real image by inputting the real image into the pose encoder of the trained GAN, to produce a pose transformation matrix for each instance in the real image, wherein each pose transformation matrix is used to generate a depth image for each instance; and
   identify pixels in the depth images corresponding to the instances of the real image, by identifying a set of pixels in each depth image, based on a predetermined pixel depth threshold, and merge the sets of pixels for the depth images to form an instance segmentation map for the real depth image.

2. The system of claim 1, wherein the trained discriminator is configured to learn to (a) count whether a number of rendered instances matching a number of instances in the data distribution of the real image; (b) provide that rendered instances in the estimated depth image look identical under diverse viewpoints to the instances in the data distribution of real images; and (c) whether a layout of the estimated depth image is similar to compositions of the instances in the real depth image.

3. The system of claim 1, wherein the estimated depth images are inputted into the trained GAN and segmented into its instances by encoding the instances using an instance encoder to produce latent vectors, each latent vector is then independently translated to a single instance depth image, following which the single instance depth images are thresholded on depth to find pixels associated with the instances, which are merged to form the single instance segments, these single instance segments are merged to produce the instance segmentation for the real depth image input.

4. The system of claim 1, wherein the generator uses noise vectors from the training depth images to generate the estimated depth image, and the encoder is configured to input the estimated depth image and as an output reconstruct each noise vector in the noise vectors at training time.

5. The system of claim 1, further comprising:
   each noise vector output of the encoder is matched with the noise vectors used by the generator, such that the matching uses an optimal transport loss,
   wherein the output noise vector of the encoder is used to produce intermediate features that match with the intermediate features produced using the noise vectors by the generator, such that the matching uses a Euclidean loss,
   wherein the noise vectors of the encoder are re-used in the generator to produce a new estimated depth image, which are configured to match with a previously generated estimated depth image, such that the matching uses an L1 loss, and
   wherein the Encoder is trained via backpropagating over a loss computed by adding the optimal transport loss, the Euclidean loss, and the L1 loss.

6. The system of claim 1, wherein the real depth image is obtained from at least one sensor including one of, (a) a time-of-flight depth camera, (b) a structured light depth camera, (c) a stereo depth camera that is one of at least two infrared cameras, an infrared projector or a color camera.

7. The system of claim 6, wherein the at least one sensor is positioned to sense objects in one or more bins.

8. The system of claim 1, wherein the objects are components of a manufacturing kit or objects to be shipped, and the objects are identified by an identifier, upon the objects being identified, the processor accesses stored instructions that, when executed by the processor, cause the processor to: (a) retrieve a list of expected components of the manufacturing kit or objects to be shipped assigned to a first customer based upon the identifier; (b) compare the list to a customer database to verify the list of expected components are to be delivered within a time period to the first customer; and (c) upon confirming the delivery time period, identify differences between the list of expected components to the first customer database of the objects.

9. The system of claim 1, wherein the generator is configured to generate the estimated depth image based on a real depth image and is configured to produce a target segmentation and target attributes once the training period is complete.

10. The system of claim 9, wherein the estimated depth image is a translated version of the real depth image.

11. The system of claim 9, wherein the generator is further configured to generate the estimated depth image based on the target segmentation, the target attributes, and a latent vector.

12. The system of claim 1, further comprising:
a check-in system configured to associate an identity of a customer with one or more bins containing objects, such that the check-in system includes one or a combination of, a radio frequency identification (RFID) transceiver, a WiFi transceiver, a reading device, a wireless transceiver device or some other transceiver device or another reading device.

13. The system of claim 1, wherein, during a training period, the GAN including the trained generator, trained discriminator and trained pose encoder has been trained by accessing training depth images from the data storage, the training images having identical instances as the instances of the real depth image, and input the training depth images in the generator to generate estimated depth images representing an implicit three-dimensional model of the object.

14. A system for object-instance segmentation on a depth image consisting of identical instances of a 3D object, the system comprising:
a processor and a memory with computer code instructions stored thereon, the processor and the memory, with the computer code instructions, configured to cause the system to
capture a latent 3D representation of the 3D object using an implicit template implemented as a parameter tensor;
produce a 3D pose transformation matrix from a noise vector using a pose encoder implemented as a first neural network;
generate a fake depth image using a generator implemented as a second neural network configured to apply multiple 3D transformation matrices, produced by the first neural network using multiple noise vectors, on the implicit template;
use a discriminator implemented as a third neural network to distinguish a real depth image from the fake depth image, and output a discrimination result as a function thereof;
decompose the fake depth image into latent vectors using an instance encoder implemented as a fourth neural network, the instance encoder outputs a set of latent vectors that match the set of noise vectors used in the pose encoder; and
iterative operation of the implicit template, the pose encoder, the generator, the discriminator, and the instance encoder during the training period causes the discriminator and generator to train in an adversarial relationship with each other and the generator, the implicit template, the pose encoder, and the instance encoder to train in a collaborative relationship with each other, and wherein the instance encoder at the end of the training period having its fourth neural network trained to produce latent vectors that match with the noise vectors corresponding to the 3D pose of the instances in a generated depth image with an increased amount accuracy than at the start of the training period, wherein after the training period, given a real depth image including of multiple instances of the 3D object, the instance encoder produces latent vectors for each 3D object instance, the latent vectors are iteratively used to produce corresponding 3D transformation matrices by the pose encoder, to produce single instance depth images by the generator consisting of only one instance of the 3D object in each depth image, and
wherein pixels corresponding to a valid depth in the produced single instance depth image is used as the instance segmentation.

15. The system of claim 14, wherein the training of the GAN is configured to implicitly force the generator to capture a distribution of single object instances, and that the when using the trained GAN for instance segmentation, the pose encoder takes as input the estimated depth image, and is trained to reproduce instance noise vectors, such that each instance noise vector is individually decoded by the generator to form a single object instance.

16. The system of claim 14, wherein the generator and the discriminator are trained in a min-max adversarial game so that the generator learns to generate images that can fool the discriminator, while the discriminator is in turn trained to distinguish whether the input data into the discriminator are real or fake, such that optimization occurs when the discriminator is unable to recognize whether the input data in the discriminator is from the generator or the real depth image.

17. The system of claim 14, wherein the trained GAN is configured to learn to segment identical instances of objects randomly placed in a bin in an unsupervised approach.

18. The system of claim 14, wherein the generator is a single instance generator that learns distribution of appearances of a rigid object from a cluttered or complicated scene including multiple identical instances.

19. The system of claim 14, wherein the pose encoder takes as input the estimated depth image and produces as an output latent noise vectors.

20. The system of claim 14, wherein the estimated depth image includes a noise vector that is inputted into the pose encoder, and as an output produces an axis-angle representation of a 6D pose of an instance.

21. The system of claim 14, wherein the discriminator is configured to learn to count whether a number of rendered instances matches a number of instances in the real depth image, and whether a layout of the estimated depth image is similar to compositions of the instances in the real depth image.

22. The system of claim 14, wherein the generator and the discriminator are trained in a min-max adversarial game so that the generator learns to generate images that can fool the discriminator, while the discriminator is in turn trained to distinguish whether the input data into the discriminator are real or fake, such that optimization occurs when the discriminator is unable to recognize whether the input data in the discriminator is from the generator or the real depth image.

23. A method for producing 3D object instance segmentation by generating verisimilar images from real depth images, comprising:
receiving a real depth image with instances of an object;
inputting the training depth images in a trained generator to generate estimated depth images representing an implicit three-dimensional model of the object;
inputting, simultaneously, each estimated depth image into a trained discriminator and a trained pose encoder, the discriminator discriminates each estimated depth image against the training depth images to obtain a discriminator loss, and the pose encoder generates a set of pose transformation matrices that are matched to a set of sampled transformation matrices, to obtain a matching loss;

repeating, iteratively, the process on the estimated depth images, until the discriminator loss and the matching loss are minimized to a threshold, to complete the training period;

identifying the instances in the real depth image by inputting the real depth image into the pose encoder of the trained GAN to produce a pose transformation matrix for each instance in the real depth image, wherein each pose transformation is used to generate a simulated depth image for each instance in the real depth image;

identifying pixels in the simulated depth images corresponding to the instances of the real depth image, by identifying a set of pixels in each simulated depth image, based on a predetermined pixel depth threshold; and merging the sets of pixels corresponding to the same instance in the simulated depth image, to produce an instance segmentation map of verisimilar images for the real depth image.

24. The method of claim 23, wherein the trained during a training period, the GAN having the trained generator, trained discriminator, and trained pose encoder are included in a generative adversarial neural network (GAN), wherein the GAN has been trained by accessing training depth images from data storage, the training depth images have identical instances as the instances of the real depth image.

25. A system, comprising:
a processor and a memory with computer code instructions stored thereon, the processor and the memory, with the computer code instructions, configured to cause the system to:

use an implicit template configured to capture a latent three-dimensional (3D) representation of a 3D object, and a pose encoder configured to produce a 3D pose transformation matrix from a noise vector; and a generator configured to apply multiple 3D transformation matrices using multiple noise vectors on the implicit template to generate a fake depth image, and output the fake depth image, jointly, to a discriminator and an instance encoder, wherein the discriminator is configured to distinguish a real depth image from the fake depth image, and output a discrimination result as a function thereof, and the instance encoder is configured to output a set of latent vectors that match the set of noise vectors used in the pose encoder, wherein during a training period, an iterative operation trains the discriminator and generator in an adversarial relationship with each other, and trains the generator, the implicit template, the pose encoder and the instance encoder in a collaborative relationship with each other, and wherein the trained instance encoder is configured to produce latent vectors for each 3D object instance, the latent vectors are iteratively used to produce corresponding 3D transformation matrices by the trained pose encoder, to produce single instance depth images by the trained generator that include only one instance of the 3D object in each depth image, and wherein pixels corresponding to a valid depth in the produced single instance depth image is used as the instance segmentation.

26. A robotic system for manipulating an object, comprising:
a robotic arm having a manipulator configured to handle the object, wherein the manipulator comprises:
a twist configured to ensure multiple degrees of freedom of moving the object;
an end-tool configured to hold the object;
an imaging device configured to measure start and/or goal poses of the robotic arm for successfully manipulating the object; and
a robotic controller that comprises:
a processor connected to a transceiver and data storage, and computer readable instructions including a trainable generative adversarial neural network (GAN) having a trainable generator, a trained discriminator and a trainable pose encoder that, when executed by the processor, cause the processor to receive a real depth image with instances of an object, via the transceiver;

input, simultaneously, each estimated depth image into the discriminator and the pose encoder, the discriminator discriminates each estimated depth image against the real depth image to obtain a discriminator loss, and the pose encoder generates a set of pose transformation matrices that are matched to a set of sampled transformation matrices to obtain a matching loss;

iteratively repeating the process on the estimated depth images, until the discriminator loss and the matching loss are minimized to a threshold, to end the training period;

identify the instances in the real image by inputting the real image into the pose encoder of the trained GAN, to produce a pose transformation matrix for each instance in the real image, wherein each pose transformation matrix is used to generate a depth image for each instance; and identify pixels in the depth images corresponding to the instances of the real image, by identifying a set of pixels in each depth image, based on a predetermined pixel depth threshold, and merge the sets of pixels for the depth images to form an instance segmentation map for the real depth image.

\* \* \* \* \*